(12) United States Patent
Koya et al.

(10) Patent No.: US 8,939,724 B2
(45) Date of Patent: Jan. 27, 2015

(54) SYSTEM AND METHODS FOR WIND ENERGY RECAPTURE FROM A NON NATURAL WIND SOURCE

(75) Inventors: Hisanori Koya, Miyakonojyo (JP); David William Yang, Island South (HK); Roland Emlyn Williams, Martinez, CA (US)

(73) Assignee: Green Earth Power Company Limited, Hong Kong (HK)

( * ) Notice: Subject to any disclaimer, the term of this patent is extended or adjusted under 35 U.S.C. 154(b) by 681 days.

(21) Appl. No.: 13/072,666

(22) Filed: Mar. 25, 2011

(65) Prior Publication Data

US 2011/0293419 A1    Dec. 1, 2011

Related U.S. Application Data

(60) Provisional application No. 61/350,015, filed on May 31, 2010.

(51) Int. Cl.
| | |
|---|---|
| *F03D 7/00* | (2006.01) |
| *F03D 11/00* | (2006.01) |
| *F03D 9/00* | (2006.01) |
| *F03D 7/02* | (2006.01) |

(52) U.S. Cl.
CPC .............. *F03D 11/00* (2013.01); *F03D 9/002* (2013.01); *F03D 7/02* (2013.01); *F05B 2220/602* (2013.01); *F05B 2220/604* (2013.01); *Y02B 10/30* (2013.01); *Y02B 10/70* (2013.01); *Y02E 10/722* (2013.01); *Y02E 10/725* (2013.01); *F05B 2250/311* (2013.01); *F05B 2250/312* (2013.01); *F05B 2250/314* (2013.01); *F05B 2260/64* (2013.01); *F05B 2270/103* (2013.01)

USPC ....................................... 416/1; 416/9; 416/25

(58) Field of Classification Search
USPC ......... 415/224.5, 4.1, 4.3, 4.5, 146, 151, 202, 415/222, 223, 905, 908, 208.5, 2.1; 416/198 R, 189, 188, 201 R, 201 A, 1, 9, 416/25; 60/805; 290/55, 44
See application file for complete search history.

(56) References Cited

U.S. PATENT DOCUMENTS

| | | | | |
|---|---|---|---|---|
| 3,858,644 A | * | 1/1975 | Beck et al. ........................ | 165/51 |
| 3,999,884 A | * | 12/1976 | Fuller ............................ | 415/144 |
| 4,080,100 A | * | 3/1978 | McNeese ....................... | 416/189 |

(Continued)

FOREIGN PATENT DOCUMENTS

| | | |
|---|---|---|
| JP | 2008-002322 | 1/2008 |
| WO | WO 2007-017918 | 2/2007 |
| WO | WO 2009-136413 | 11/2009 |

OTHER PUBLICATIONS

ISA/KR, PCT International Search Report and Written Opinion, Application No. PCT/US2011/037469, dated Nov. 17, 2011, 9 pages.

*Primary Examiner* — Nathaniel Wiehe
*Assistant Examiner* — Eldon Brockman
(74) *Attorney, Agent, or Firm* — Kang S. Lim

(57) ABSTRACT

The present invention relates to a system and method for harvesting wind energy from air exhausted by other systems. Ventilation and heat exchange systems force air movement using fans. Exhaust airflow may also be the result of a combustion system. The exhaust air is generally wasted as it is diffused back to the atmosphere. Significant energy may be recovered from this exhaust air using relatively small turbines inserted into the airflow. Careful positioning of the turbine maximizes the recovery efficiency.

16 Claims, 22 Drawing Sheets

(56) References Cited

U.S. PATENT DOCUMENTS

| | | | |
|---|---|---|---|
| 4,178,124 A * | 12/1979 | Puskas | 415/4.5 |
| 4,213,736 A * | 7/1980 | Gongwer | 415/222 |
| 4,720,640 A * | 1/1988 | Anderson et al. | 290/43 |
| 4,776,755 A * | 10/1988 | Bjorkestam et al. | 415/121.2 |
| 5,512,788 A * | 4/1996 | Berenda et al. | 290/55 |
| 5,599,172 A * | 2/1997 | McCabe | 417/334 |
| 6,126,385 A * | 10/2000 | Lamont | 415/4.5 |
| 6,365,985 B1 * | 4/2002 | Cohen | 290/55 |
| 7,357,622 B2 * | 4/2008 | Corten et al. | 416/1 |
| 7,538,447 B1 * | 5/2009 | Berenda et al. | 290/55 |
| 2008/0150292 A1 * | 6/2008 | Fedor et al. | 290/55 |
| 2009/0066089 A1 * | 3/2009 | Arinaga et al. | 290/55 |
| 2009/0200808 A1 | 8/2009 | Parmley, Sr. | |

* cited by examiner

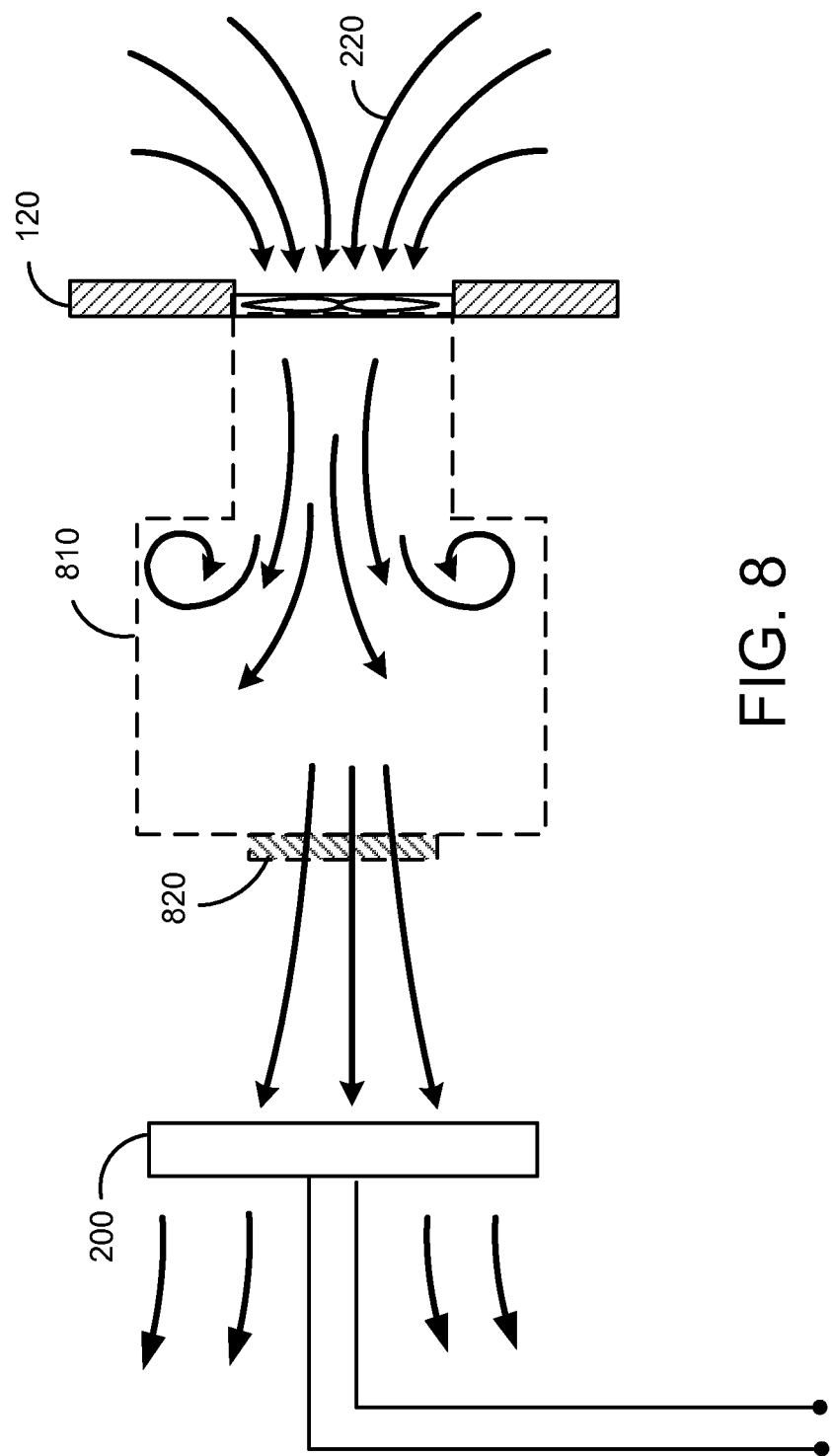

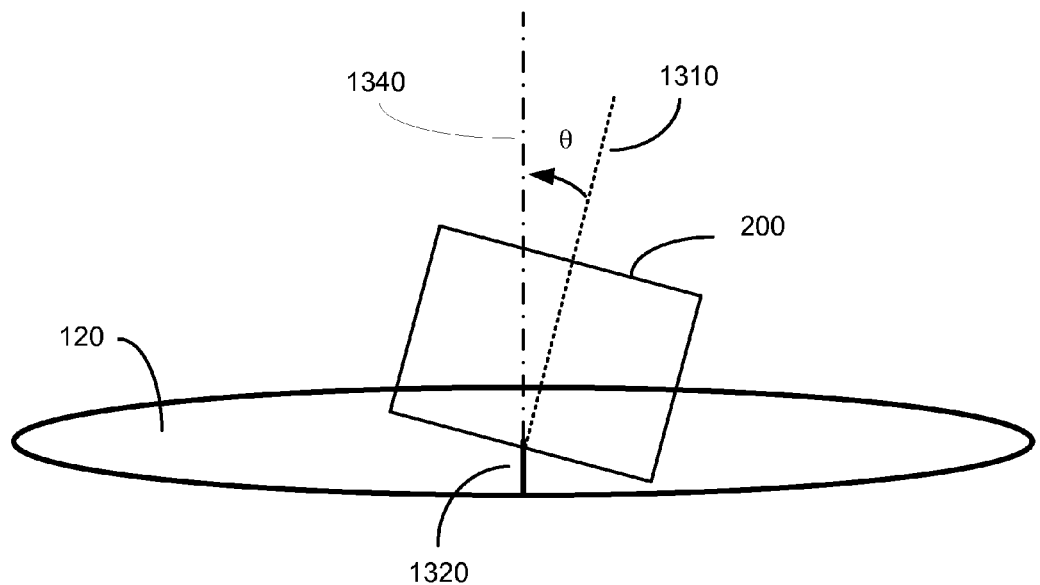
Figure 13
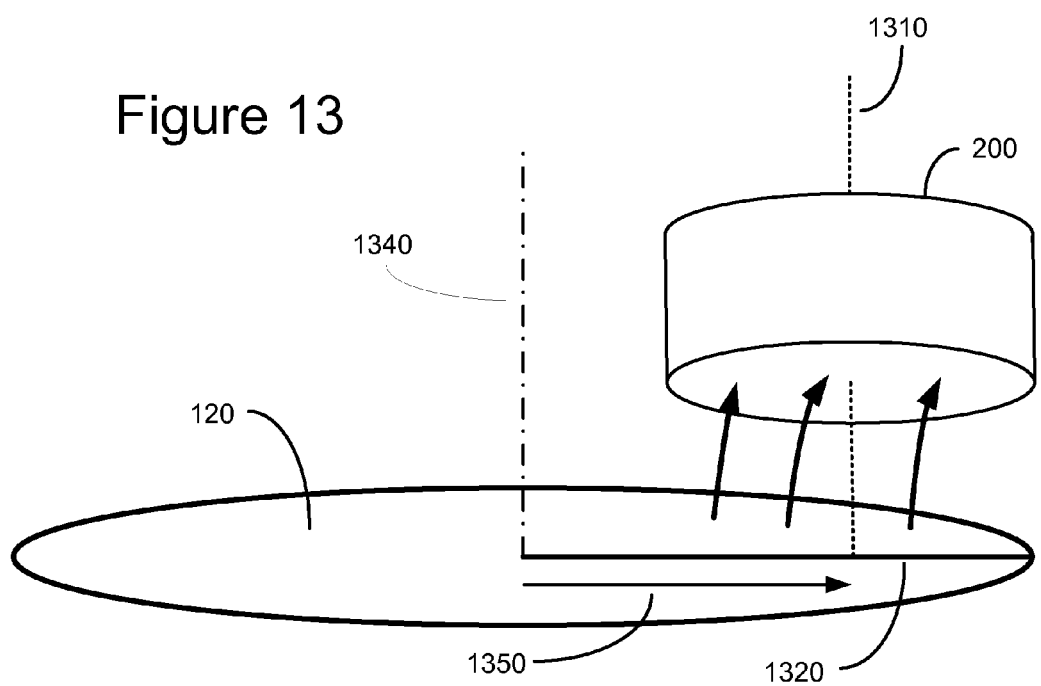

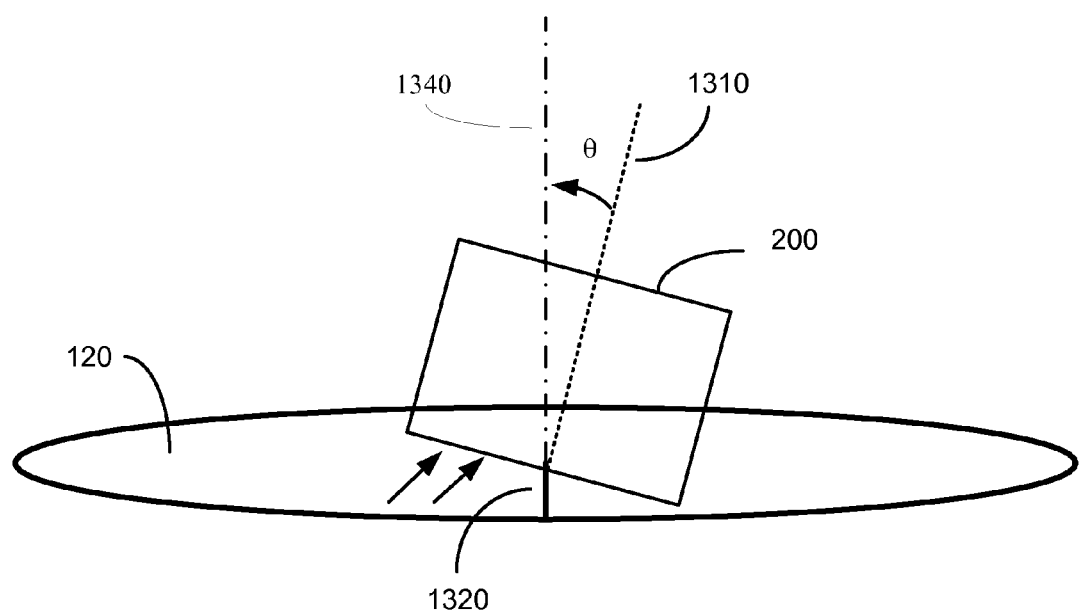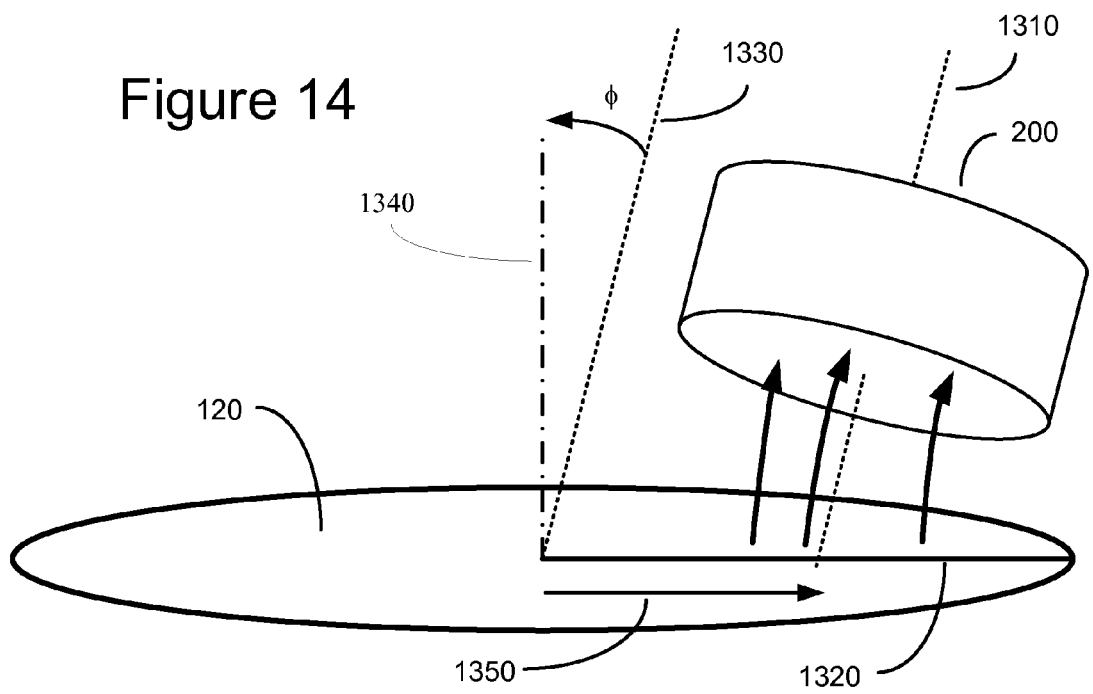
Figure 14

--PRIOR ART--

--PRIOR ART--

SYSTEM AND METHODS FOR WIND ENERGY RECAPTURE FROM A NON NATURAL WIND SOURCE

CROSS REFERENCE TO RELATED APPLICATIONS

This non-provisional application claims the benefit of provisional application No. 61/350,015, filed May 31, 2010, entitled "System and Methods for Wind Energy Recapture From a Non Natural Wind Source", which is hereby fully incorporated by reference.

BACKGROUND OF THE INVENTION

The present invention relates to a system and methods for improving the performance of airflow energy harvesting techniques. In particular, where airflow is the result of some forced air application, as would be the case with a ventilation or heat exchange system or other fan driven air movement, installation costs may be reduced. This system and method may be of particular use in ventilation system utilized on animal housing, such as barn rooms for pig and poultry farming.

Animal farming requires significant ventilation of the animal housings. Modern pig buildings (and poultry buildings) are complex structures with a high need of environmental control. Many of the structures are tunnel ventilated. The ventilation system is a central part of the accommodation, which must be integrated with the building to achieve an acceptable living environment and to aid in bio-security and disease prevention. Open window type housing is inadequate and exposes the livestock to many communicable diseases brought in by other animals, birds or bats. Lack of control may lead to environmental failure and, as a consequence, abnormal behavior, such as tail biting, or disease problems might arise.

Ventilation systems are based on the principle that when cool outside air moves through a building, it warms and picks up moisture, provides circulation, oxygenates the enclosed housing and removes pollutants such as gases and dust. In warming, it removes heat from the building. In winter, the ventilation system is mainly used to control the moisture content of the air. Additional heat might be required to maintain the temperature of the controlled environment and to ensure that the humidity is controlled. The exhausted air contains considerably more energy than the cool air that entered the system.

Ventilation for an animal housing operates almost constantly and consumes large quantities of energy over the course of a year. This is a substantial component of the operating cost of a farm. By reducing ventilation energy costs, by improving efficiency and/or through energy harvesting or recapture, the operational costs of the farm may be dramatically reduced. This provides the farm with a commercial advantage over competitor farms, as well as reducing energy consumption, which aids the environment.

Currently a number of known methods for improving animal housing energy efficiency are employed. These include better insulation of housing buildings, fan systems optimized for efficiency, wind-tunnel type ventilation designs and methods which take advantage of convection and passive ventilation principles. However, despite these improvements in energy efficiency for animal farming, the constant usage of large scale fans is a major expenditure of energy.

Forced air movement is also commonplace throughout industrial and commercial premises. Ventilation systems, a routine part of environmental control systems, are also to be found throughout urban areas and, in general, the energy in the exhausted air is simply allowed to diffuse into the atmosphere. In some cases this process may be controlled to some extent to mitigate the noise footprint of the system. Typically, diffuser systems and plenum assemblies are added to the exhaust port so as to enable a smoother transition to ambient conditions. By controlling the flow, turbulence may be reduced which in turn may greatly reduce the noise produced.

Quite often, because it is being powered by a large, simple fan, an output airstream rotates in a spiral fashion and creates significant turbulence. This produces noise and there is usually a desire to reduce this. Ducting may be added to the outlet port so as to reduce or eliminate this rotation and flow straighteners may also be added. These are simple in design and sometimes crude, but generally operate so as to control costs and achieve acceptable results. Where a centrifugal fan is used, often referred to as a "squirrel cage blower," the rotational energy is not usually significant but the base application is normally for systems where a substantial pressure gain is required. Typically these would be used to pressurize a duct system used for positive pressure ventilation.

Because there is considerable energy in the exhaust airflow, attention is being paid to efforts to extract some of this energy by using small wind powered generators in the airstream. The concerns about increasing the loading on the prime mover are well understood, though the problems of finding a good location point for the wind turbine have been a challenge. Empirical guidelines for keeping the wind turbine about a meter away from the primary exhaust fan helps ensure that there is no significant increase in back-pressure. In an attempt to make the airflow resemble natural winds, some installations make use of flow straightening techniques to ensure that the turbine sees something approaching the linear flow characteristics of a free airstream, especially where the driving fan is in close proximity to the outlet, but at the cost of complexity of the resulting assembly.

In cases where the energy recovery or harvesting is space constrained, flow straighteners may be impractical and other means must be employed to gain turbine efficiency in a machine generated airflow. In general, it is not desirable to make any modifications or attachments to the original ventilation or exhaust system to ensure that no warranty or liability concerns are created from the original installation.

It is therefore apparent that an urgent need exists for optimization of wind turbines located so as to harvest or scavenge energy from an air exhaust having a driving fan in close proximity to the outlet. This improved system enables a useful increase in efficiency, reduced dependence on ducting and flow straighteners and simplified installation.

SUMMARY OF THE INVENTION

To achieve the foregoing and in accordance with the present invention, a system and method for harvesting wind energy in an exhaust stream is provided. In particular the system and methods for positioning and adjusting a turbine in the exhaust air flow of a ventilation or heat exchange system in the turbulent, non-linear air flow which is often found proximate to the fan that drives the air. For small turbines whose diameter is in the neighborhood of half of the diameter of the driving fan, the turbine of the energy harvesting system may be angularly offset from a position where the axis would be normal to the plane of the driving fan.

A number of parameters may be measured to allow the turbine performance to be changed. Sensors which may be used to measure performance may be electrical, electronic, pneumatic or hydraulic or a combination of these. To cope with varying wind velocity in the exhaust flow, the pitch of the blades of the turbine may be adjusted to control performance responsive to the information delivered by any sensors. In addition, where the energy output is in the form of a voltage, this voltage may be used directly to control operation of the system. A cowl or shroud may be added to the turbine assembly, which assembly may include an energy conversion component such as a generator, and its position may be altered responsive to information delivered by the sensors.

For large turbines, the wind turbine and the exhaust source may be located substantially in the same axis of rotation. Further, the wind turbine may be positioned with a substantially optimal separation between the wind turbine and the exhaust source.

This optimal separation is substantially in the range of 0.5 meter to 1.5 meters. In some embodiments, the separation is roughly one to three times the exhaust source diameter. In other embodiments, the separation between the wind turbine and the exhaust source is dependent upon the exhaust source diameter, the wind turbine size, and the speed of the exhaust from the exhaust source.

In some embodiments, the system may include a baffle through which the exhaust from the exhaust source is channeled. In some embodiments the baffle is substantially cylindrical in shape. Further, the baffle may be designed such that it is roughly three times as long as its diameter.

In other embodiments, the baffle is substantially conical in shape. This baffle type may be designed with the outside edge rolled to ensure that the airflow transition is not abrupt. Regardless of baffle geometry, the baffle may be designed, in some embodiments, to include a flow straightener.

Changes to the position of the energy harvesting system may be effected with actuators, responsive to the information from the sensors, including any directly acting voltage. The actuators may be electrical, mechanical, pneumatic or hydraulic or a combination of technologies. Sensor information may be processed prior to being used to control actuators. Sensors may be direct acting, for example, rotational speed may be sensed using centrifugal effects and the resulting motion used to control speed of rotation as is well known in the art.

The energy harvested is converted to rotational energy by the turbine. This energy may be transferred to another form. The energy conversion may be done in any of a number of ways known in the art. The turbine may be coupled to an electrical generator and the electrical energy consumed directly. The electrical energy may be stored in batteries or other storage devices for later consumption.

The turbine may have a pump coupled to it and this pump used to pump a fluid into a storage device such as a pressure vessel or an elevated containment receiver. In this example, the kinetic energy of the turbine is transformed into potential energy which, in one implementation, may be released by allowing the fluid to pass through a motor and using that to drive an electrical generator.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIG. 8 shows the use of a diffuser incorporating a plenum chamber and a flow straightener;

FIG. 13 illustrates tilt for a small turbine located to one side of the axis of the driving fan in an embodiment of this invention;

FIG. 14 illustrates the pan direction for a small turbine located to one side of the axis of the driving fan in an embodiment of this invention;

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

The present invention relates to a system and methods for harvesting wind energy in an exhaust stream produced by a driving fan in close proximity to the outlet. In particular, the wind energy harvesting system may include efficiency baffles, in some embodiments, and one or more wind turbines. This system has particular use in exhausting ventilation systems, such as those utilized by animal housing.

One benefit of the energy harvesting or recapture system is that since the ventilation fans are required to operate on a near constant basis, the energy harvesting system provides a consistent energy source. Likewise, turbine technology is constantly improving, therefore, more efficient, smaller and cheaper wind turbines are available for use in the energy harvesting system. Turbine designs will be discussed in more detail below.

Figure 1A:
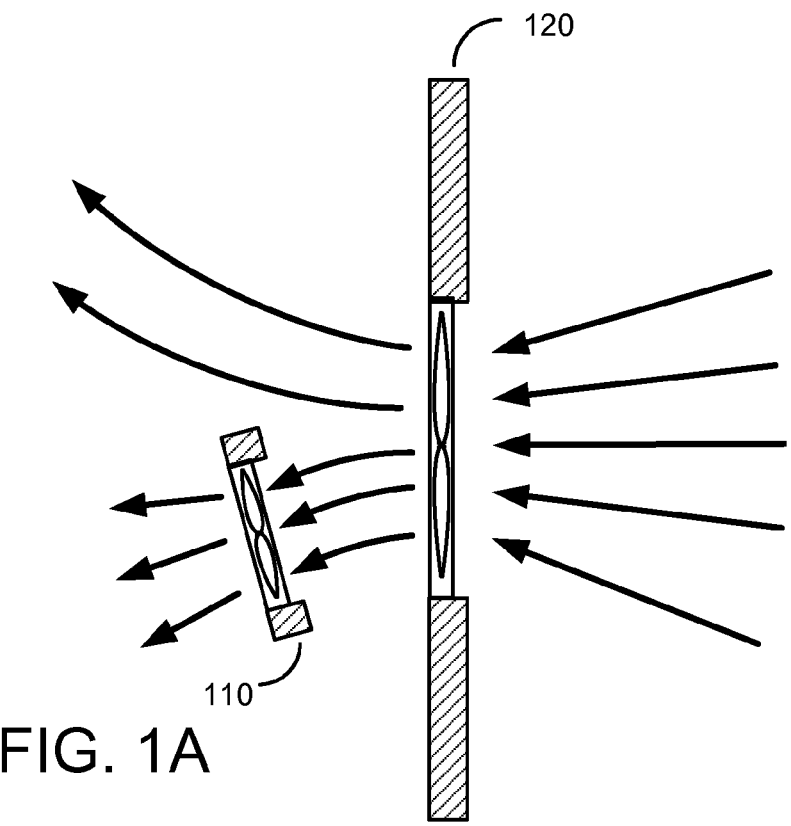
FIG. 1A shows an exemplar placement of a small turbine in an exhaust air flow, in accordance with one embodiment of this invention.

To facilitate discussion, FIG. 1A shows a simple view of positioning a small turbine, 110, whose diameter is not much greater than the radius of the driving fan, 120, in the exhaust air flow after the driving fan. The flow rate at the axis of the driving fan is generally lower than the main flow so it may be better to position the small turbine to one side as shown.

Figure 1B:
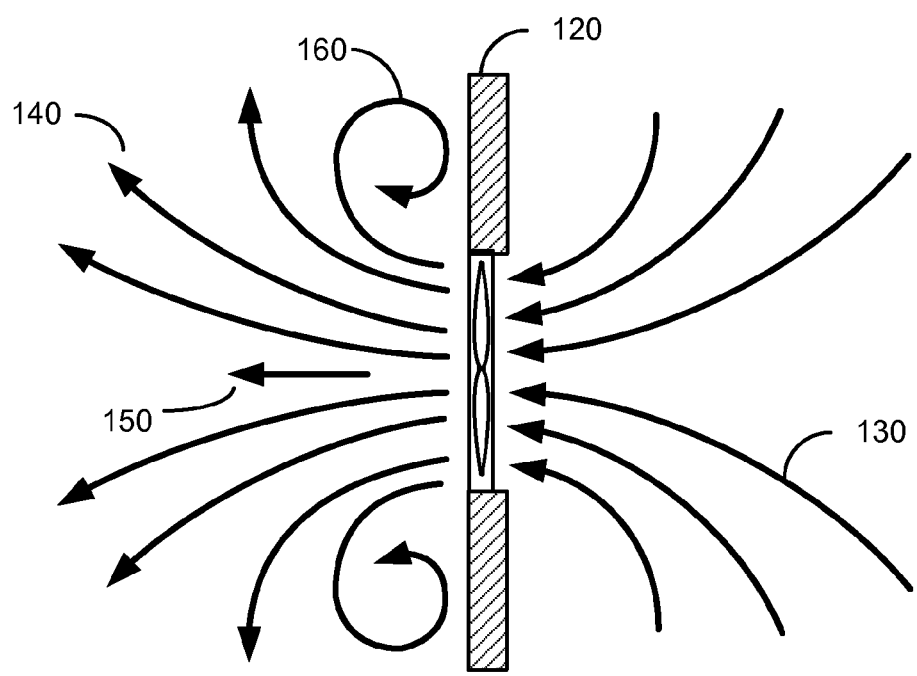
FIG. 1B shows the typical airflow pattern around a ventilation fan.

FIG. 1B shows a representative air flow associated with a fan, 120. The intake side draws air, 130, into the fan and it is expelled at the exhaust side of the fan. The air flow on the exhaust side of the fan, is generally strongest to one side of the axis of rotation, 140, with reduced flow near to the axis, 150, and turbulent flow, forming vortices at the edge of the fan diameter, 160.

Figure 2:
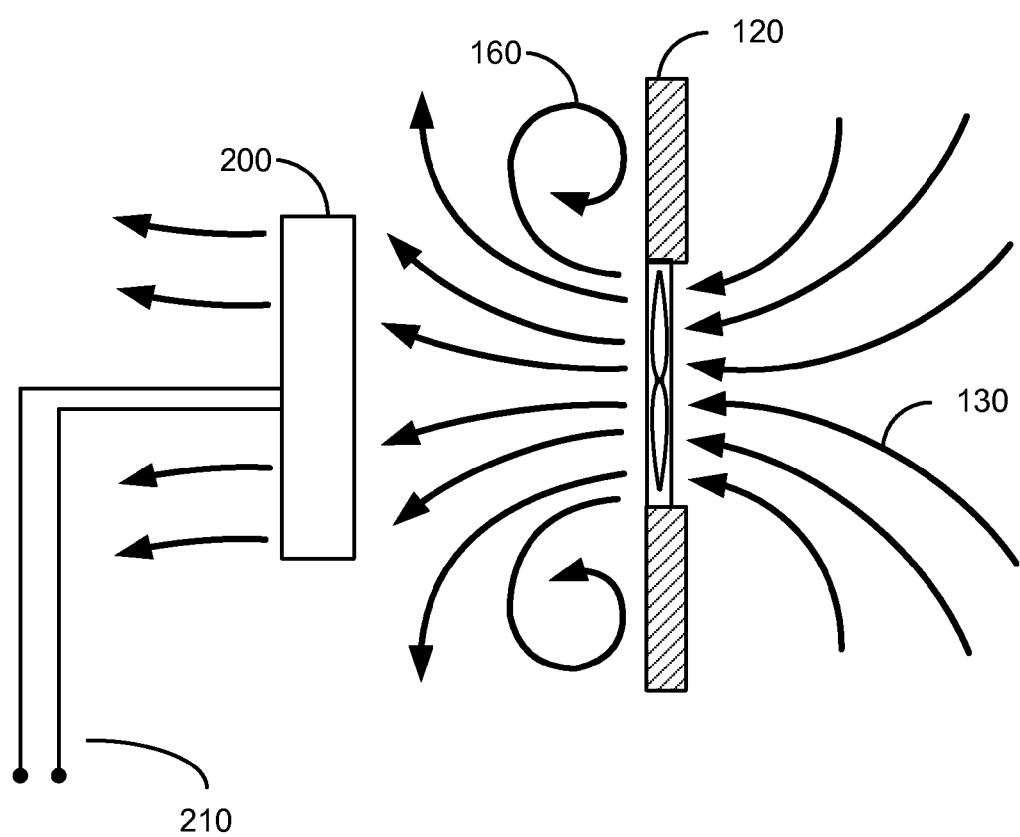
FIG. 2 shows the placement in the airflow of a wind turbine of comparable size to the driving fan.

When a large turbine is used, with a diameter significantly greater than the radius of the driving fan, the plane of the turbine that harvests the energy in the exhaust airflow may be set approximately parallel to the plane of the driving fan and the axis may be, preferably, close to the axis of the driving fan. FIG. 2 shows a typical implementation. The driving fan, 120, is normally shrouded in an enclosure both to enhance its efficiency and for safety purposes to stop accidental encounter with the fast moving blades. The large turbine, 200, is placed more or less symmetrically in the air flow so as to harvest as much energy as it can. The distance between the large turbine, 200, and the driving fan, 120, is chosen so as to optimize performance. If the distance is too close, then there may be a considerable rise in back pressure and the efficiency of the driving fan decreases noticeably. If the distance is too great, the energy harvest decreases. A working distance in the neighborhood of 0.5 to 1.5 meters may give good performance for most applications. Energy output is designated as 210 and this may be electrical, in the case of a generator co-located with the turbine, or fluid flow in the case of a pump co-located with the turbine.

Figure 3A:
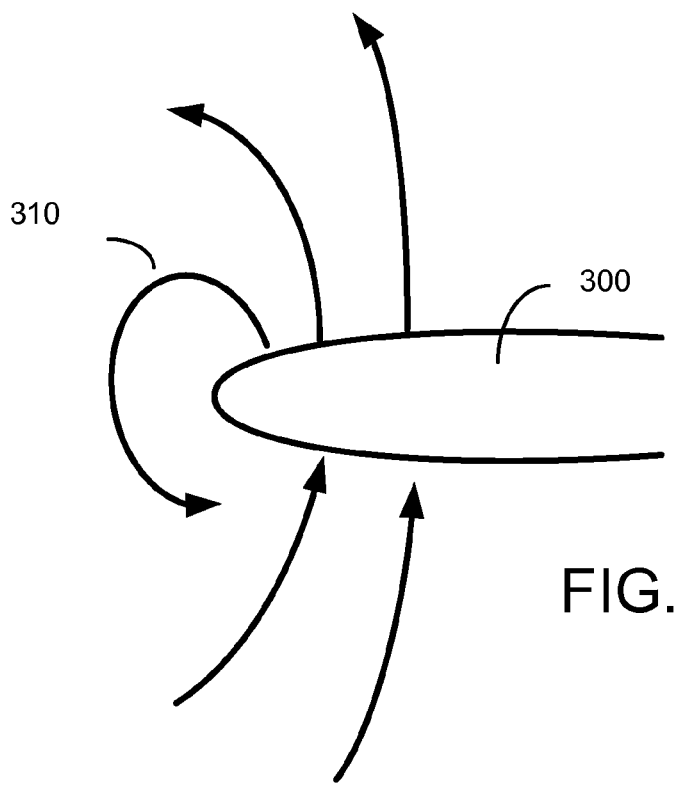
FIG. 3A shows a typical blade tip vortex.
Figure 3B:
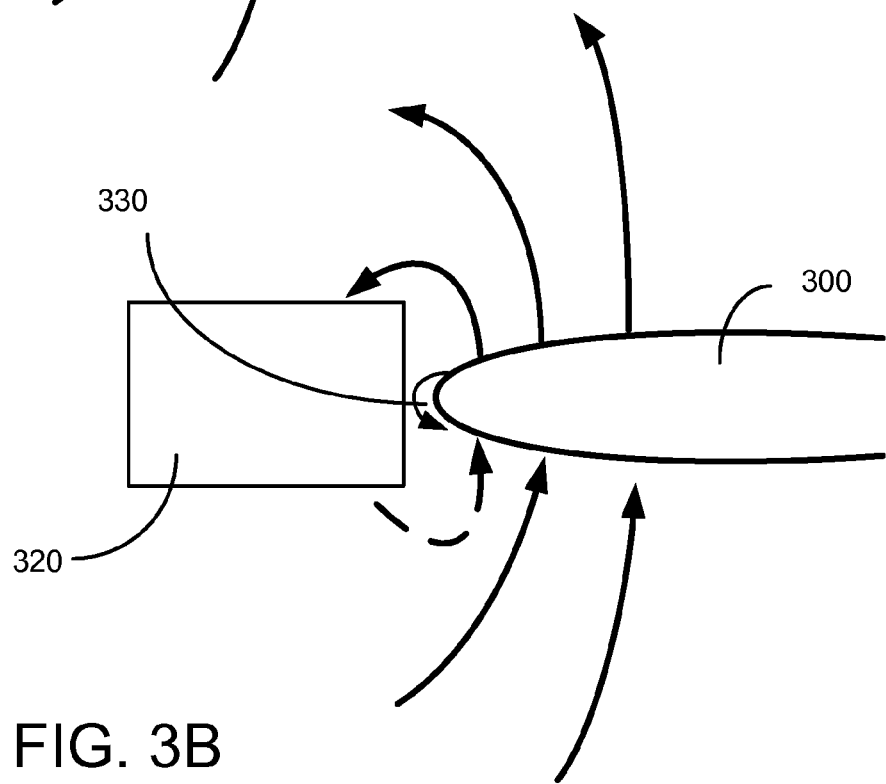
FIG. 3B shows the effect of interfering with the tip vortex by the placement of an obstruction or a close fitting shroud.

As is well known in the art, the tips of the blades are a region where the air under pressure intended for the exhaust or outlet side of the fan attempts to move back around the blade tip to the lower pressure air behind, as shown in FIG. 3A. This flow represents turbulence and the curving airflow forms a vortex, 310, at the tip of the fan blade, 300. This vortex is a major source of noise from a fan and any reduction of this noise is considered to be beneficial both to the efficiency of the fan and to the environment around. A close fitting shroud, 320, as shown in FIG. 3B, interferes with and so greatly reduces these tip vortices, 330, and, because these vortices are a significant source of noise and drag, improves the efficiency of the fan considerably. This effect is an essential element in the optimization of high performance compressors for jet engines and blade tip vortex control is considered a significant factor in any propeller system.

Figure 4:
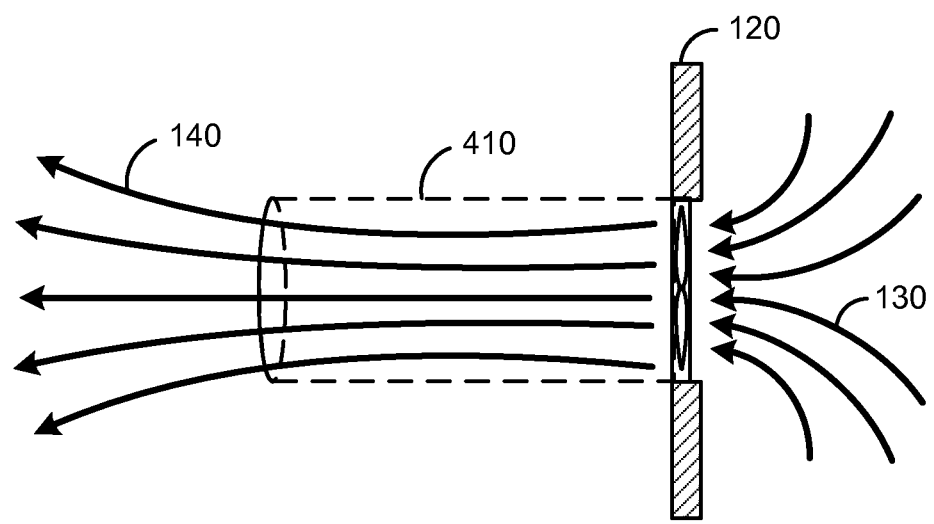
FIG. 4 shows the air flow pattern resulting when a diffuser is placed at the outlet of the driving fan.
Figure 5A:
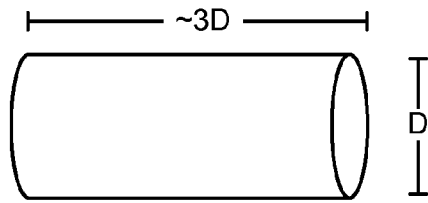
FIG. 5A shows a typical cylindrical diffuser.
Figure 5B:
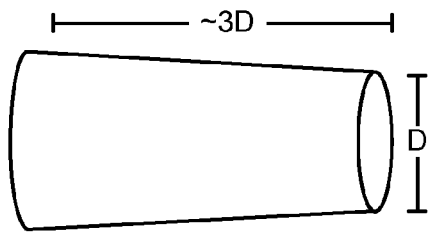
FIG. 5B shows a conical diffuser.
Figure 5C:
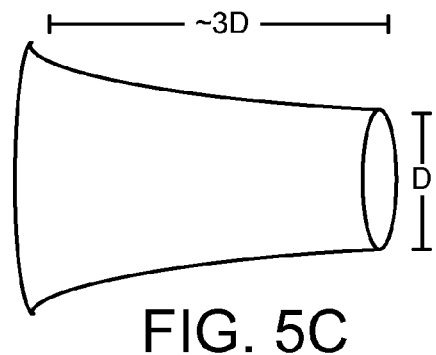
FIG. 5C shows a diffuser with an exponential curvature.
Figure 5D:
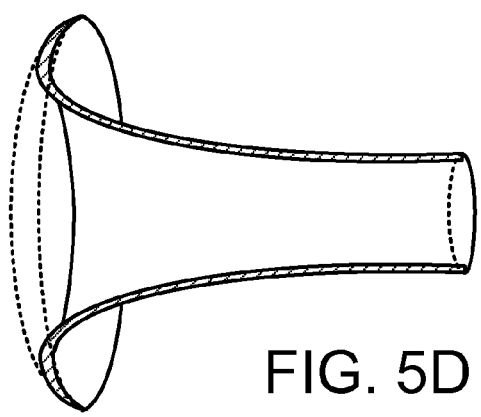
FIG. 5D shows an exponential horn type of diffuser with a rolled edge.

The airflow from the driving fan may see a sudden change in cross-section as it leaves the exhaust fan, 120, as shown in FIG. 1B. Such a step change in cross-section is another region where significant turbulent flow may occur forming a vortex, 160. Preventing or reducing this vortex may also reduce noise and, if the exhaust region can be ducted, as shown in FIG. 4, so as to produce a gradual transition to ambient atmosphere, then environmental performance may be much improved. This duct acts as a diffuser and allows time for the air flow, 140, to reach relatively uniform pressure and velocity distribution inside the diffuser, 410, before being released to the atmosphere. This means that the vortex responsible for most of the noise, 310, may be mostly suppressed and although the exhaust air, 140, diffuses and expands, it is a far more uniform process. Diffusers may take several forms as shown in FIGS. 5A-5D. Simple forms can be a circular duct running for some distance beyond the driving fan. In general, a length to diameter ratio of about 3:1 as shown in FIG. 5A provides good reduction of turbulent flow. More complex forms can be conical, as shown in FIG. 5B, allowing the area to smoothly increase with distance from the driving fan and thus allowing the pressure in the exhaust flow to drop gradually towards atmospheric pressure. More exotic geometries having an exponential profile, as shown in FIG. 5C are practical and excellent performance can be achieved by rolling the edge where the diffuser terminates like a trumpet bell, as shown in FIG. 5D, but this may be prohibitively expensive and is generally unnecessary for industrial applications.

Figure 6:
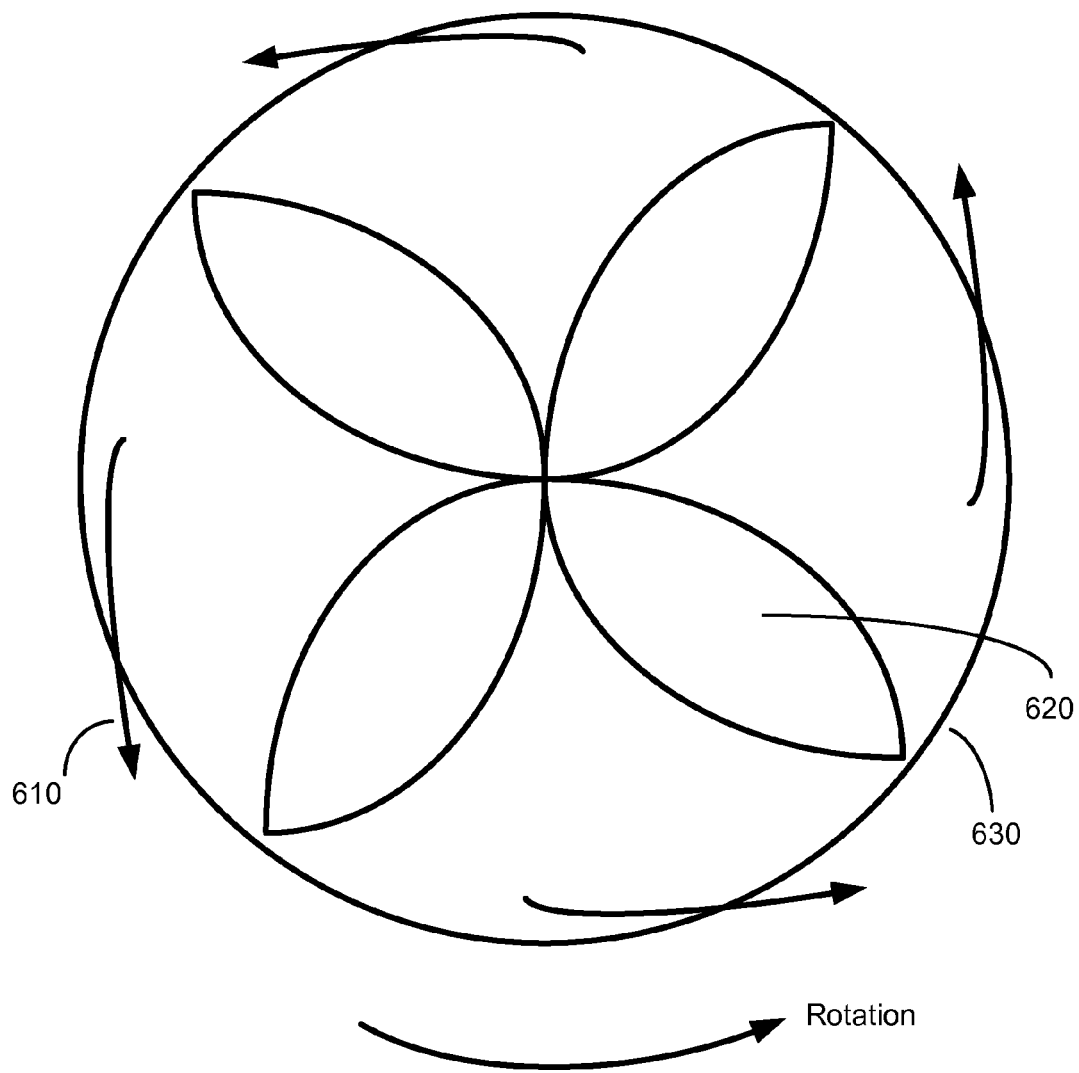
FIG. 6 illustrates air flow rotation and the centrifugal effect normally found close to the driving fan.
Figure 7A:
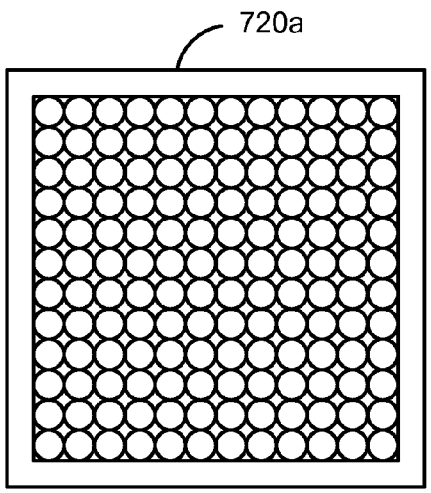
FIGS. 7A through 7D show typical flow straightening structures.
Figure 7B:
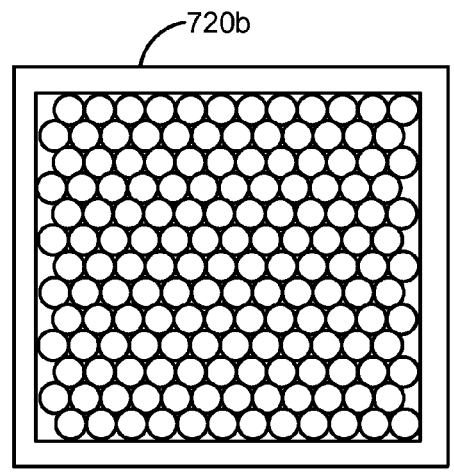
Figure 7C:
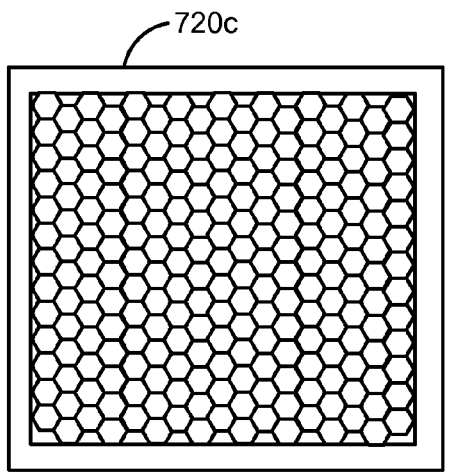
Figure 7D:
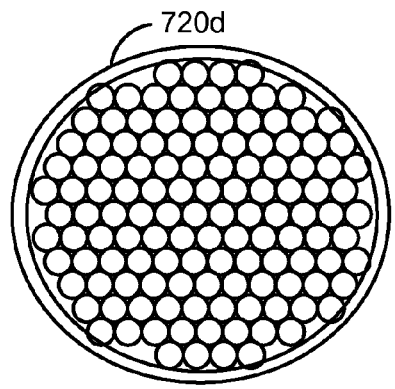

When a driving fan is proximate to the exhaust or outlet, an additional component of the exhaust airflow is generally rotation, shown in FIG. 6. The fan is shown as 620 and the fan's shroud or cowl as 630. The rotation is marked on the figure. Absent any baffling or interference, this air flow rotation is in the same direction as the driving fan's rotation. Because the airflow rotates, it experiences a centrifugal effect which causes the column of exhaust air to diffuse outwards, 610, faster than if it were simply the result of a pressure difference. Except for very low speed fans, it may also cause that area of the airflow close to the axis of the fan to be at a slightly lower pressure than the air around it if the rotational speed is sufficient. This relatively large scale rotating vortex may also contribute to noise.

Just as adding a diffuser helps control the transition to ambient atmosphere and reduce noise, the further addition of elements to straighten the air flow may reduce or stop the rotation and may greatly attenuate its noise footprint. Straighteners may be of various forms, some complex and some very simple. A commonly used solution to rotating flow is simply to use a long duct having a square or rectangular cross section. Although not a particularly efficient form, it impedes rotation and over a sufficient length will reduce it to minor proportions. Almost any structure which divides the airflow in the principal direction of the flow can be used to force the airstream into a linear form and remove a considerable amount of turbulent flow. Preferred structures may be fabricated by stacking tubular elements closely as shown in FIGS. 7A-7D. Such structures need not be very long to show a meaningful improvement in the linearity of the airflow and reduction in the swirl from the original rotation. Although the examples in FIGS. 7A-7D show round or hexagonal tubes, square or rectangular section tubes may also be used. FIG. 8 shows an example of a driving fan, 120, coupled to a wind turbine, 200, via a ducting system or diffuser, 810, thence via a flow straightener, 820. The diffuser is a compound shape in this example and allows the airflow to pass from the fan through a smaller duct into a larger, plenum section. This is generally an effective strategy for reducing noise and results in reasonably straight airflow from the outlet point after 820.

The typical energy harvesting turbine may be designed on the assumption that an approximately linear, or laminar, airflow is applied to it. Thus interposing a flow straightener between the driving fan and the recovery turbine may be beneficial, though at some expense and complexity of the turbine assembly. The turbine may operate in generally smoother air and the reduction of turbulence at the expense of some lost energy may be expected to reduce the noise from the exhaust.

Figure 9A:
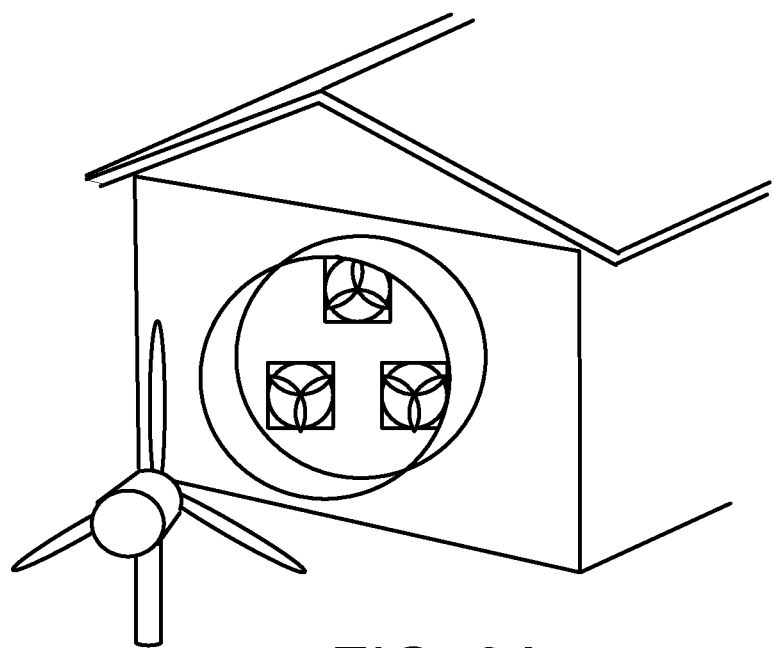
FIGS. 9A and 9B show ducting shrouds combining the output of multiple driving fans in accordance with embodiments of this invention.
Figure 9B:
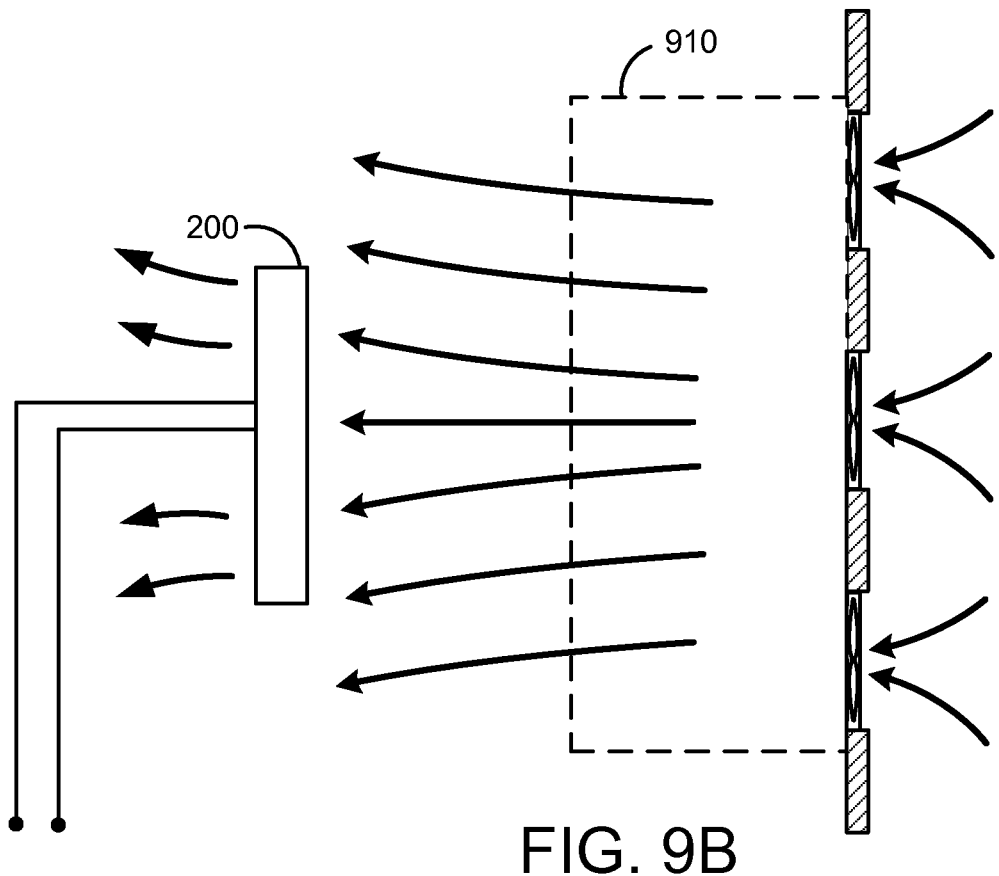
Figure 10:
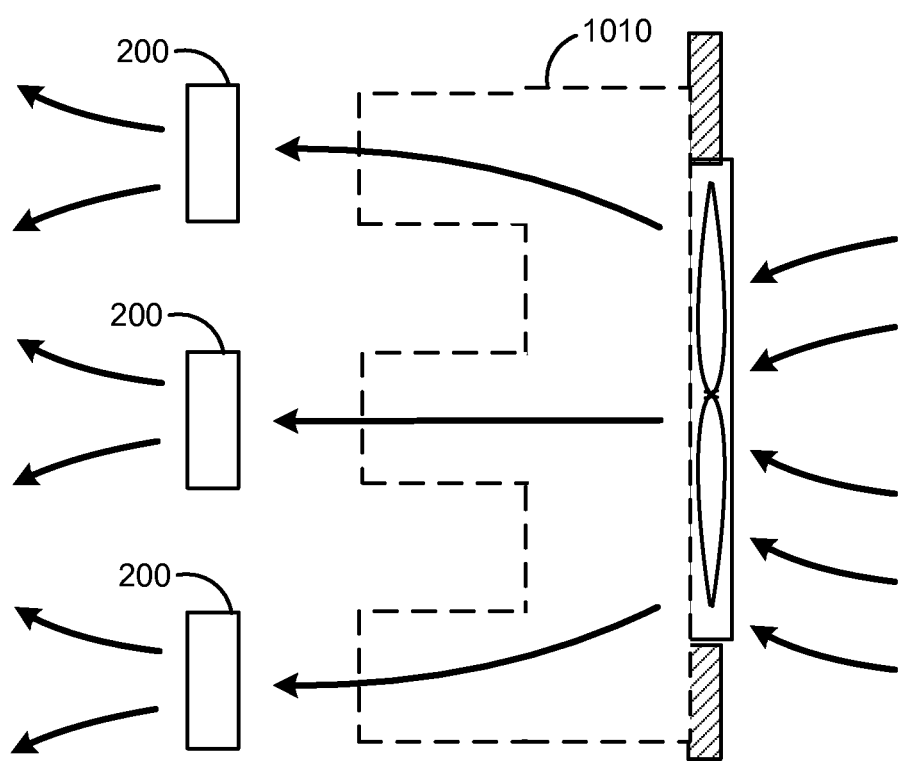
FIG. 10 shows a ducting shroud used to divide the airflow from a large driving fan between several wind turbines.
Figure 11:
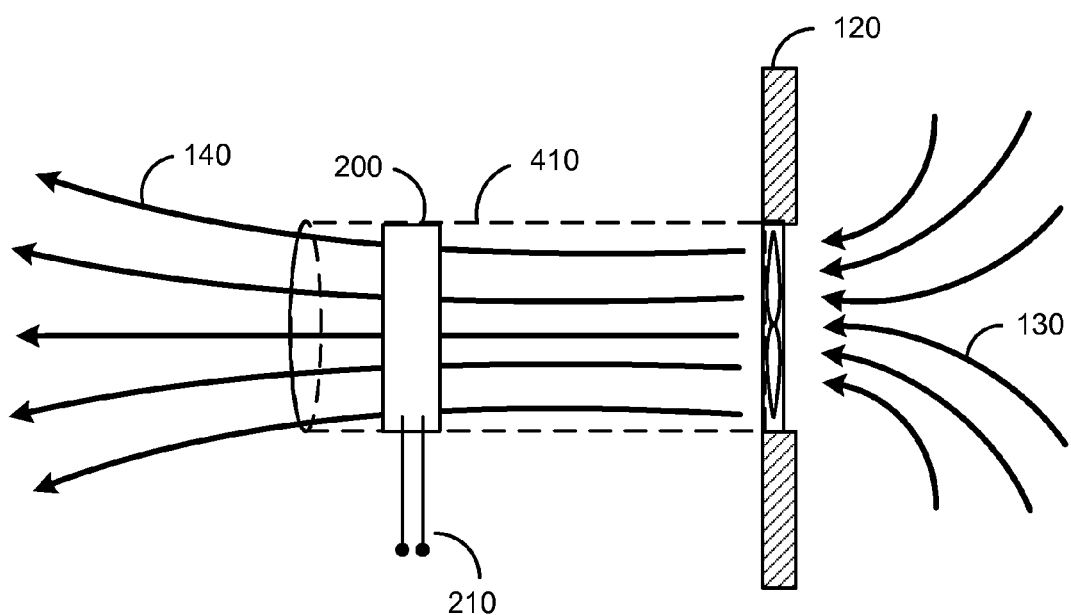
FIG. 11 shows a wind turbine located within the diffuser assembly for a driving fan.
Figure 12:
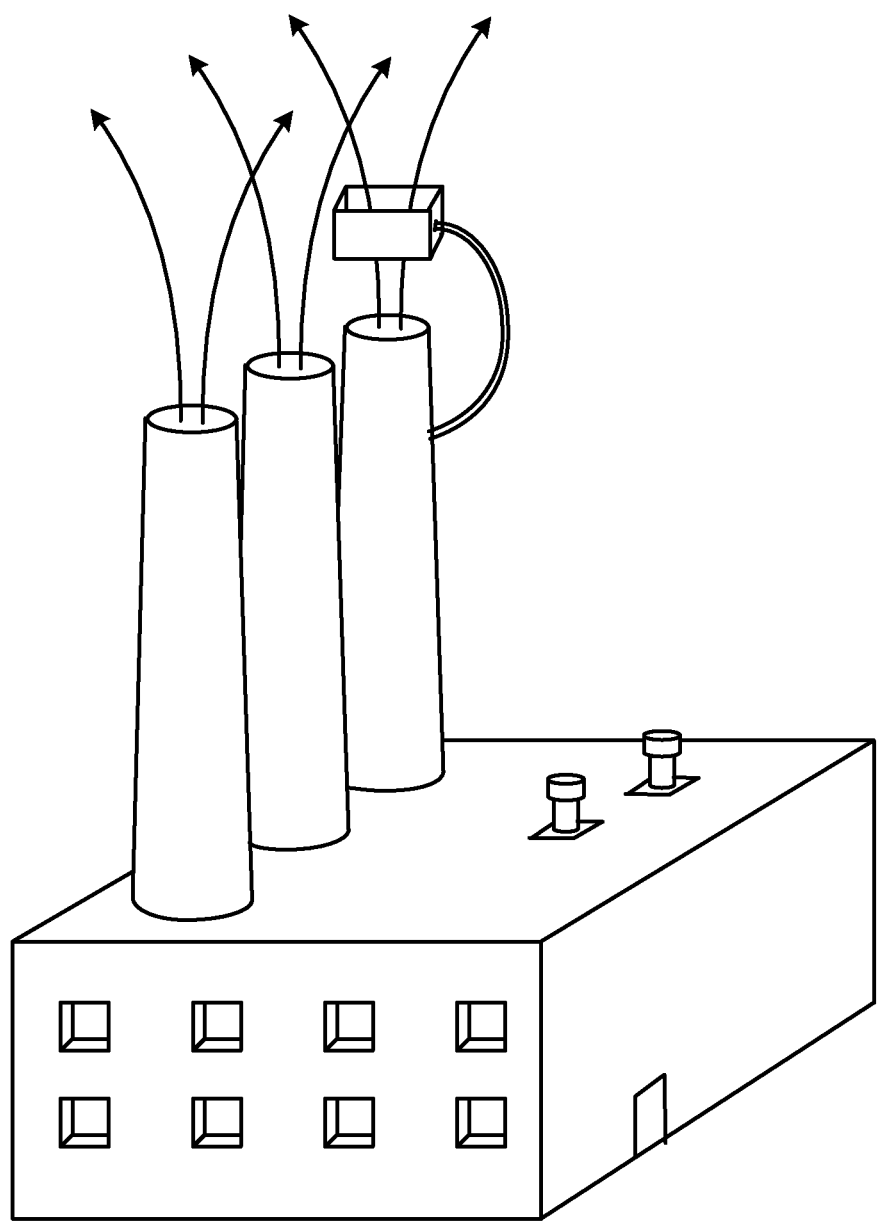
FIG. 12 shows a wind turbine located at the outlet of a combustion chimney.

FIGS. 9A, 9B and 10 show simple ways to combine or divide airflows when there is a significant size mismatch between turbines and the driving fans. The elements 910 and 1010 are the combiners and splitters respectively and may have flow straighteners incorporated with their design. It should be noted that depending on the particular installation, it may be difficult to achieve balanced flow from paralleled components. This may require significant investigation and adjustment during the installation period. FIG. 11 shows an implementation where the diffuser, 410, encloses the turbine, 200, completely. This may be effective at reducing noise but at the expense of a significant back pressure load applied to the driving fan assembly, 120, which may compromise efficiency. FIG. 12 shows a simple diagrammatic installation of a turbine in a combustion exhaust stream. It should be understood that combustion products may have an influence on such installations and steps may be taken to mitigate the effects of what may be a corrosive environment for the turbine.

In the case of a small turbine whose diameter is comparable to the radius of the driving fan, the recovery turbine may be placed in one side of the exhaust airflow, as shown in FIG. 1. Unlike the situation with the large turbine, because the small turbine operates in the airflow on one side of the exhaust stream, the turbine may be positioned so as to take advantage of the rotational vector of the exhaust airflow as an alternative to straightening the airflow.

In one implementation, FIG. 13, the plane of the turbine, 200, may be tilted in the θ direction from being parallel to the plane of the driving fan, 120, so that the axis, 1310, is better aligned with the airflow vector. The θ direction may be defined as the rotation around a radius, 1320, of the driving fan, 120, or as the angle that the axis, 1310, of the turbine makes with the plane defined by the axis, 1340, of the driving fan and the radius, 1320, on which the turbine is located.

In a second implementation, FIG. 14, the axis of the small turbine may be altered, or panned, in the Φ direction inwards along the radius, 1320, of driving fan, 120, on which the turbine is located towards the center of the driving fan so as to better align the turbine with the exhaust airflow vector, in this case accounting for the centrifugal expansion of the exhaust airflow. The Φ direction may be defined as the rotation in the plane of the radius upon which the small turbine is located, normal to the plane of the driving fan. This is the plane defined by the axis, 1340, of the driving fan and its radius, 1320. The line 1330 is a line parallel to the axis of the small turbine 200 projected onto that plane. It should be clear that by altering the angular position of the small turbine in both the θ and Φ directions that an optimal alignment with the mean airflow vector may be achieved.

Because the airflow vector varies radially, there may be some benefit to altering the radial position, r, 1350, of the turbine as part of optimizing the energy harvest. This r direction adjustment may be achieved in any of a number of ways well known in the art.

Figure 15:
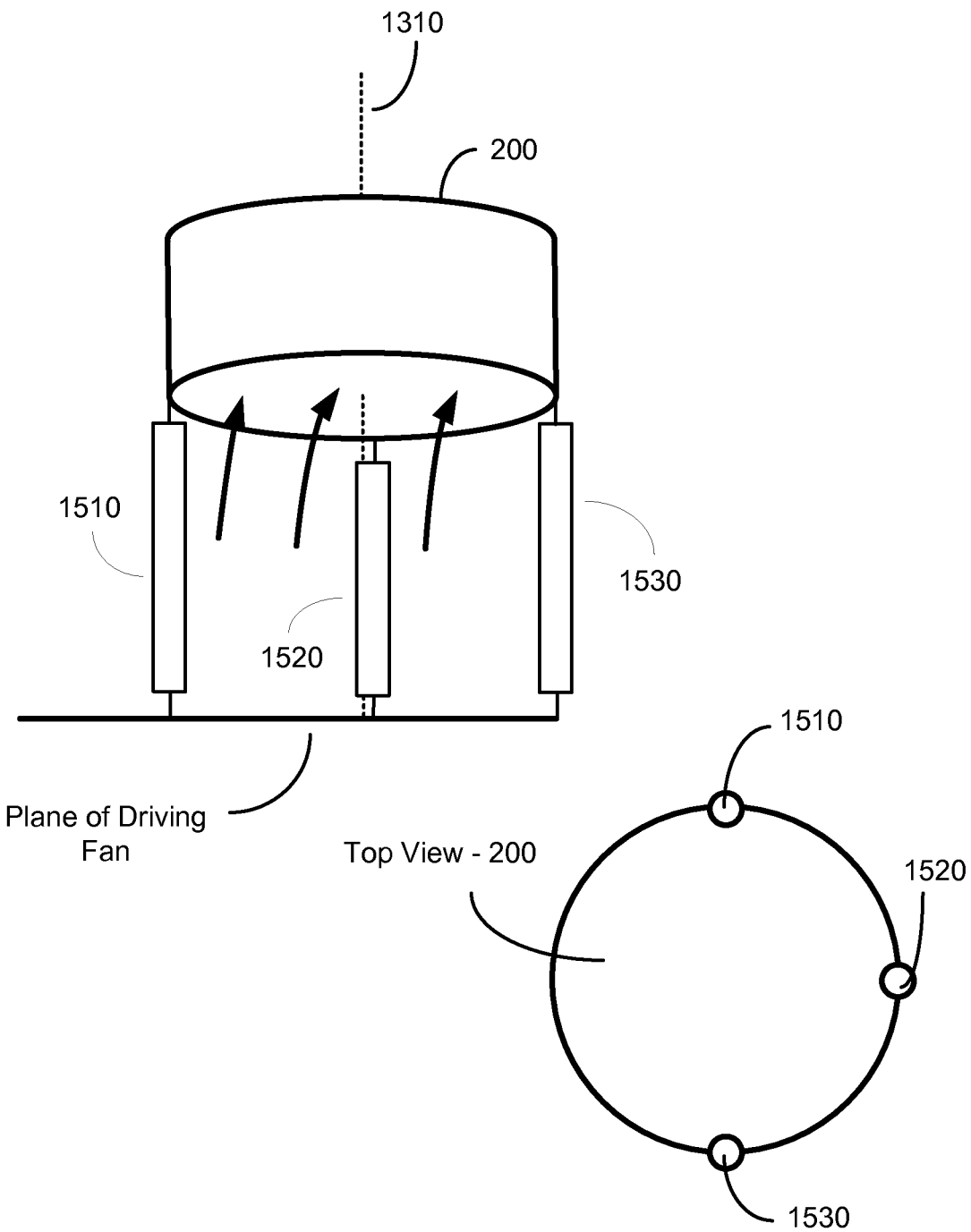
FIG. 15 illustrates the location of orthogonal adjusters in accordance with an embodiment of this invention.

In a simple system, the small turbine may be mounted as shown in FIG. 15, and adjustments made to the angular positioning using, for example, screw thread adjusters. In one implementation, three attachment points are used for each of three adjusters. One attachment point may be of fixed dimension, for example adjuster 1510 may be a pre-set length whilst adjusters 1520 and 1530 may be variable in length. When adjusted, 1530 will change the Φ angle, primarily, although there will be some small effect on θ. Adjusting 1520 however will only alter the θ angle. The effect on the radial position will be minimal. This may be economical in certain systems where an installation is highly repeatable. In this latter case, an installer may be supplied with a simple template or predetermined installation dimensions, may make the adjustments and then lock the adjusters so as to prevent tampering or other accidental changes to the system. Persons having ordinary skill in the art will appreciate that there are numerous mechanical techniques for altering the angular positions of a turbine assembly located in the airflow.

Actuators may also be used to actively alter the position of the small turbine assembly relative to the airflow. This may be beneficial in a system where the driving fan speed may change in response to environmental demand. For example, if fan speed is increased, the centrifugal effect on the air flow will be greater and the angular position may be changed to suit the new airflow vector. The actuators may be arranged as in FIG. 15 so as to allow adjustment in two approximately orthogonal planes so that changes in one plane have fairly small interaction with changes in the other plane. This foregoing may be compared to the common use of the terms Pan and Tilt when referring to the movement of a camera tripod. The actuators may be electrically operated, pneumatically operated or hydraulically operated. The control for the actuators may be effected using an electrical system wherein sensors are used to determine the optimum position. The position of the turbine may be optimized for any of turbine speed, turbine torque, turbine power output based on the product of speed and torque or the output performance from the energy conversion component coupled to the turbine. The type and use of sensors to monitor the performance of a rotating machine is well known to persons having ordinary skill in the art.

Figure 16A:
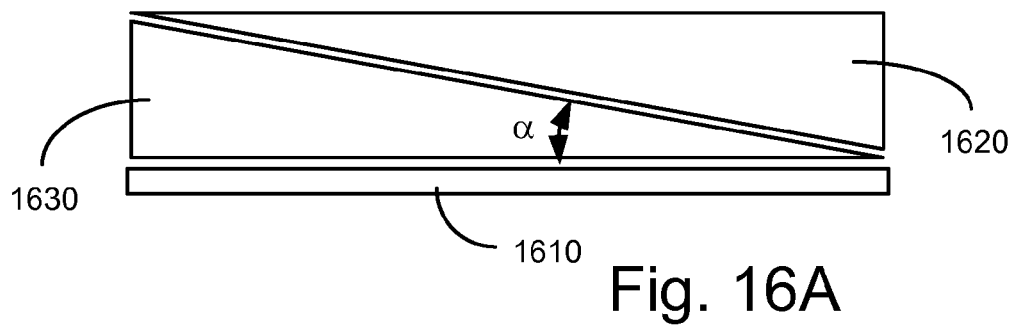
FIGS. 16A, B and C illustrate a mechanism for achieving a continuously adjustable tilt and pan angle in accordance with an embodiment of this invention.
Figure 16B:
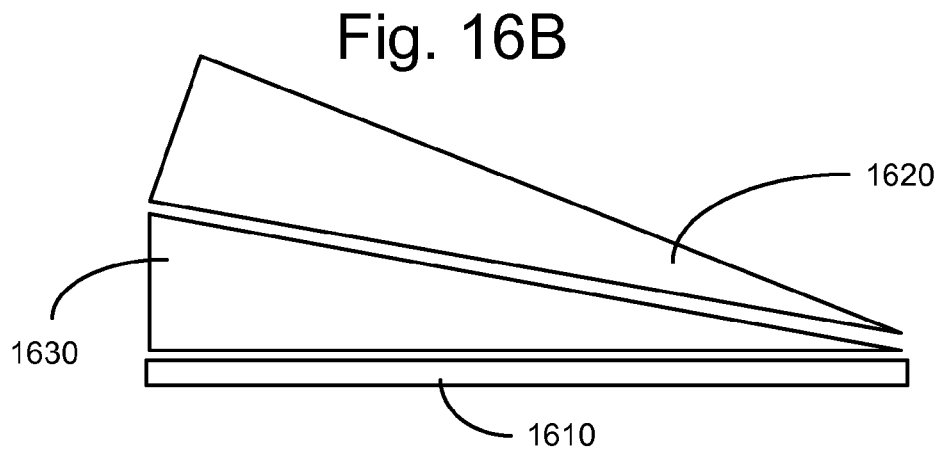
Figure 16C:
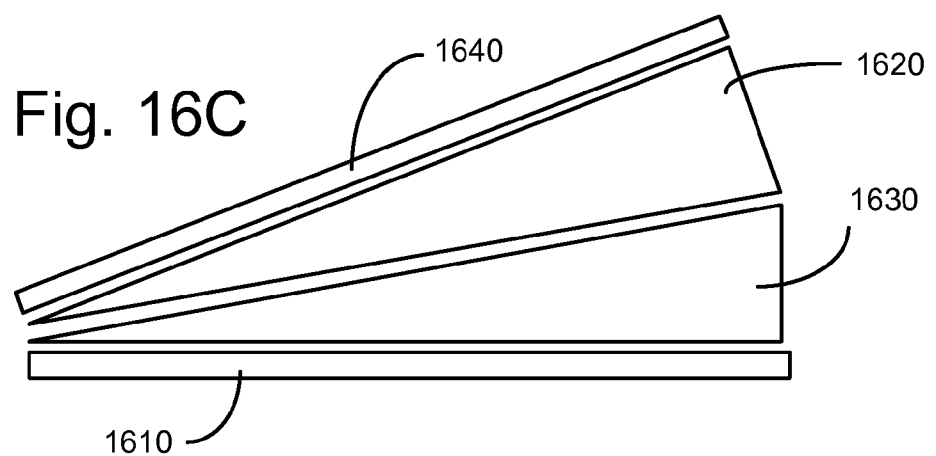

In one implementation, the actuators drive two coupled adjustment rings that allow continuous angular adjustment as shown in FIGS. 16A-16C. Ring 1610 is a parallel edged ring which forms a base bearing surface to which a stationary mounting point is attached. For example this might be a mounting post that will hold the entire turbine and adjustment assembly. The bearing detail is not shown so as to not obscure the principle of operation. A second parallel bearing ring, 1640, shown only in FIG. 16C for clarity, may be used at the upper surface of the adjustable components 1620 and 1630 to which the turbine assembly itself may be attached. All four components 1610, 1620, 1630 and 1640 can move independently of each other on a bearing surface between each one. FIG. 16A shows the ring positions set so that the upper and lower surfaces are parallel. If the upper ring, 1620, is rotated by 180°, then the result is shown in FIG. 16B. The upper surface is now at an angle of 2α relative to the base. If instead the lower ring, 1630, is rotated, then the upper surface may be displaced to an angle of 2α in the other direction. This arrangement is a simple and cost effective way of achieving a continuous angular adjustment in any direction. This is very similar to the method used to adjust a "dado" cut made using a circular saw. The range of adjustment is determined by the acute angle α and for practical purposes the rings 1620 and 1630 may be operated by a lever attached to each. Where the angular displacement of the turbine attached to the upper ring 1640 is confined to one quadrant as is generally the case with this invention, actuators may be attached to such levers directly. Where continuous 360° adjustment is desired, gear teeth may be integrated with the bevelled rings instead of levers and motors used to drive the rings to the desired position.

A particular benefit of an automated or semi-automated system is that post-installation work may be minimized and output performance may be optimized remotely. To achieve this, some of the operating parameters of the turbine installation may be measured. In one implementation, a sensor is used to measure the rotational speed of the turbine and the angular position of the turbine altered until the maximum speed is attained. In a second implementation, output current may be measured and the angular position of the turbine altered to achieve maximum current. It should be noted that the voltage from a generator may also be measured and used to peak the turbine angular position provided that the voltage is not regulated to some fixed value. An example of this would be a tacho-generator; the output from a coupled power generation alternator may be voltage limited to some safe value to charge a battery and may be independent of turbine speed over a wide range.

Figure 17A:
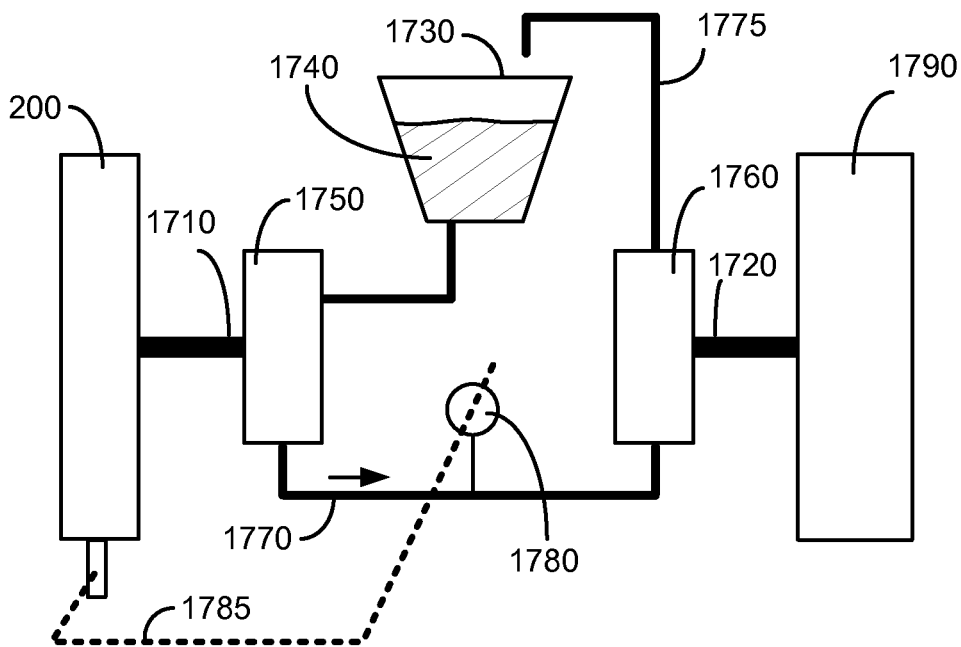
FIG. 17A illustrates the use of a fluid coupling mechanism with turbine position controlled by fluid pressure in accordance with an embodiment of this invention.
Figure 17B:
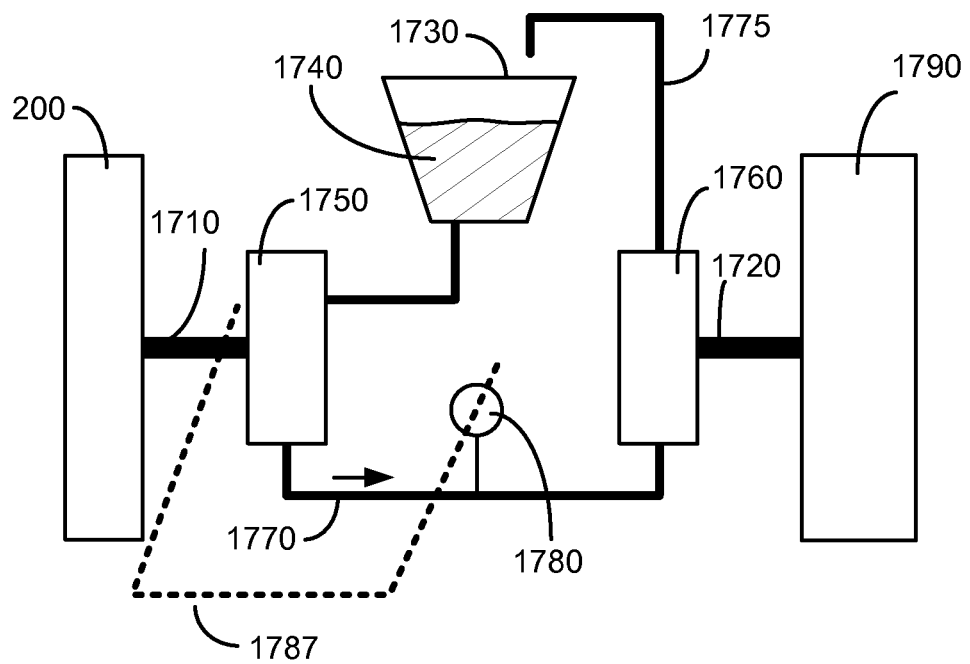
FIG. 17B illustrates the use of a fluid coupling mechanism with pump speed controlled by fluid pressure in accordance with an embodiment of this invention.

In a third implementation, a pump is used to move a fluid. Referring now to FIG. 17A, Turbine, 200, is coupled to a fluid pump, 1750, by coupling shaft 1710. The fluid pump takes working fluid, 1740, from the reservoir, 1730, and pumps it through suitable piping, 1770, to a motor, for example an hydraulic motor, 1760. Discharged fluid from the motor is returned to the reservoir via 1775. The reservoir may be separate from other components or as is well known in the art, may be incorporated as an integrated element of either the pump or the motor. It should be clear that an integrated part may not require certain external plumbing and so, for example, the supply or return pipes may not be required. The hydraulic motor, 1760, may be coupled to another energy conversion component, 1790, such as an electrical generator, by coupling 1720. It should be evident that couplings 1710 and 1720 may be simple or may incorporate speed or torque changing systems to match the needs of the overall system design. Fluid pressure may be measured, 1780, and the angular position of the turbine, 200, altered in response to the operating pressure. This may be as simple as a pressure controlled mechanical linkage, 1785, or may be sophisticated, making use of electronic control equipment along with positioning servo-mechanisms. In yet another implementation, FIG. 17B, pressure may be held constant and the coupling mechanism, 1710, between the turbine and the pump altered by linkage 1787 so as to achieve this fixed pressure and the associated delivery rate of the fluid may change. The turbine speed may also be optimized using a speed sensor, as is known in the art, to determine the best performance point.

Figure 17C:
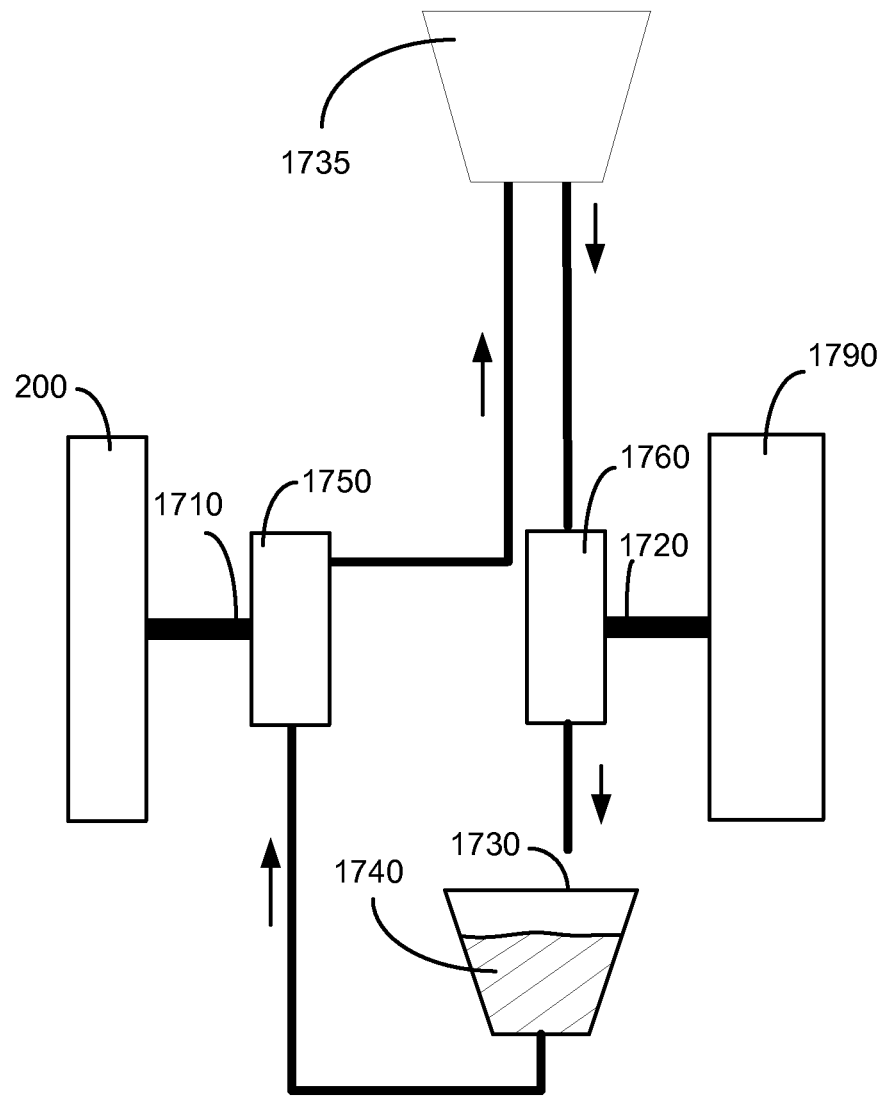
FIG. 17C illustrates hydraulic energy storage in accordance with an embodiment of this invention.

In some cases it is desired to store the energy generated for later use. For small systems, battery storage of electrical energy may be sufficient. However, FIG. 17C shows a hydraulic storage system where the energy is stored as potential energy of the working fluid in an upper elevated reservoir 1735. The turbine, 200, drives a fluid pump, 1750, which takes working fluid from a lower reservoir and pumps it to the upper reservoir. The fluid may be held in the upper reservoir until required to produce power. When demanded, fluid may be released from the upper reservoir passing through an hydraulic motor, 1760, and being discharged into the lower reservoir, 1730. The output from the motor is coupled to an energy conversion component 1790 which in one implementation may be a generator. If the upper reservoir is not pressurized, then the potential energy is simply that due to gravity, proportional to the height of the reservoir. The use of pressurized systems is well known in the art and may allow for a more compact installation.

In yet another implementation, the output power of the turbine may computed by measuring both the speed of the turbine and the torque applied to the coupling shaft and thence to the energy conversion mechanism. The value of the computed output power may be used by the controller to control the positioning of the turbine. The output power may be maximized or adjusted to comply with desired speed or torque requirements. The output power may also be displayed or reported to assure that the system is operating as intended. The display may be any of a number of display device known in the art. For example a steady light may be used to indicate proper functioning and a flashing light used to indicate an out-of-limits condition. A wireless link may be used to report system parameters.

In certain cases, for example when a pump is being operated by the small turbine, it may be desirable to operate the pump at a fixed speed in order to achieve good efficiency. This may depend upon the fluid being pumped but there may be a preference for pre-setting the speed. This may be achieved in a number of ways.

Figure 18:
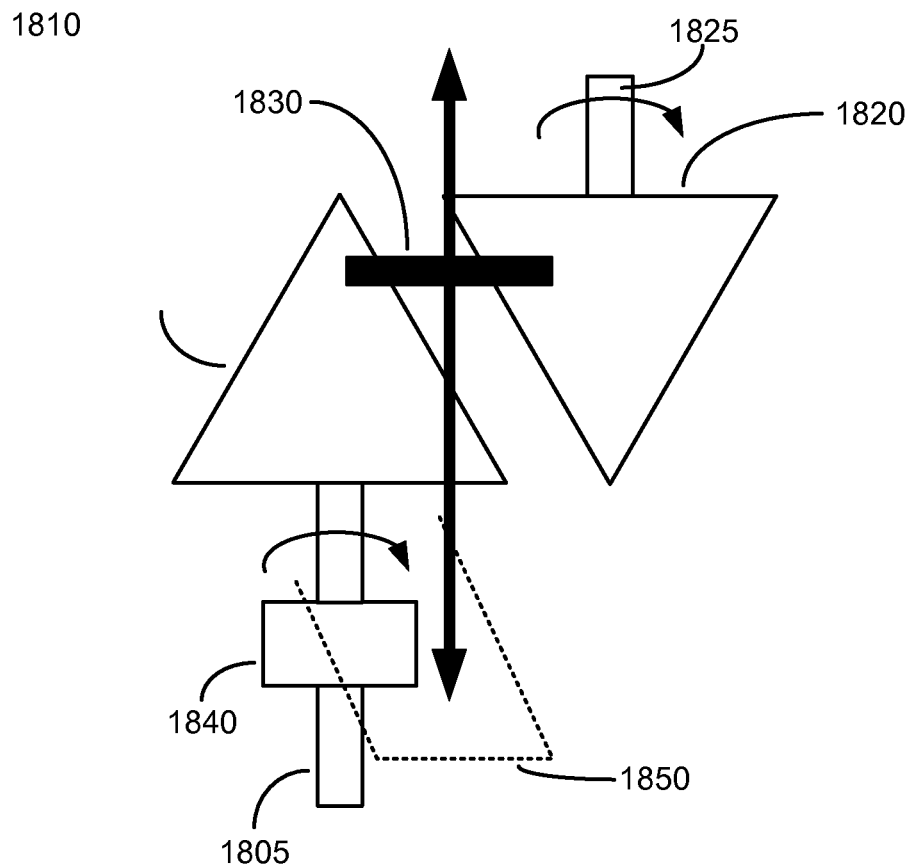
FIG. 18 illustrates a constant speed driving mechanism for use with an embodiment of this invention.

In one implementation, the turbine may be coupled to the pump using a constant speed transmission. There are several examples in the art wherein the relative positions of a wheel and a cone are adjusted to provide this function. This adjustment may be entirely mechanical, for example an arrangement of centrifugally displaced weights operates a lever to displace the wheel to a suitable position on the cone as shown in FIG. 18. To maintain the output speed constant, input rotation is applied to cone 1820 via drive shaft 1825. As the cone rotates, coupling wheel 1830, held in close contact with both cones 1820 and 1810, rotates in the opposite direction. This couples the rotation and causes output cone 1810 to rotate in the same direction as the input drive but at a speed in the ratio of the cone diameters at the point of contact of wheel 1830. A spring-loaded centrifugal governor, 1840, may be used to bias the wheel toward the narrow diameter of the input cone 1820, so that initially, the output cone 1810 turns slowly but with significant torque. As the output cone turns, the centrifugal governor 1840 may cause the coupling wheel to ride up the input cone towards the larger diameter. This causes the output speed to increase. Once the set point of the centrifugal governor is reached, the wheel is held in that position. If the speed drops, the wheel continues towards the large diameter of the input cone. If speed increases, the coupling wheel is moved towards the narrow diameter of the input cone.

Another example uses a pair of opposed conical wheels forming a variable diameter pulley coupled to a belt driving a fixed diameter pulley. Constant speed drives are well known in the art and any of a number of options may be used to achieve these functions. Although some of these coupling arrangements may be less efficient than others, pump performance may be an over-riding consideration.

In another implementation, the pump may be directly coupled to the turbine and the pitch of the turbine blades may be adjusted to hold the speed constant. Mechanisms which allow constant speed operation of propellers in the aviation industry are good example of well developed systems. Mechanical centrifugal, hydraulic and electrical actuators may be used effectively and are well known to those having ordinary skill in the art.

In the case where electrical power is required, the generator may be directly coupled to the turbine. This may be direct current generator or it may be an alternator. In general, an alternator may be single or multi-phase and may be equipped with a rectifier pack to convert the output waveform to a direct current.

In one example, the alternator may be a high voltage alternator. The benefit of this is that, for a given power output, the current is less than that required to be produced by a low voltage alternator. Since power loss in the cables used to couple the electrical circuit between the alternator and the storage battery or batteries is proportional to the square of the current flowing, a high voltage, low current solution is more efficient. This approach is well known in the art.

Figure 19:
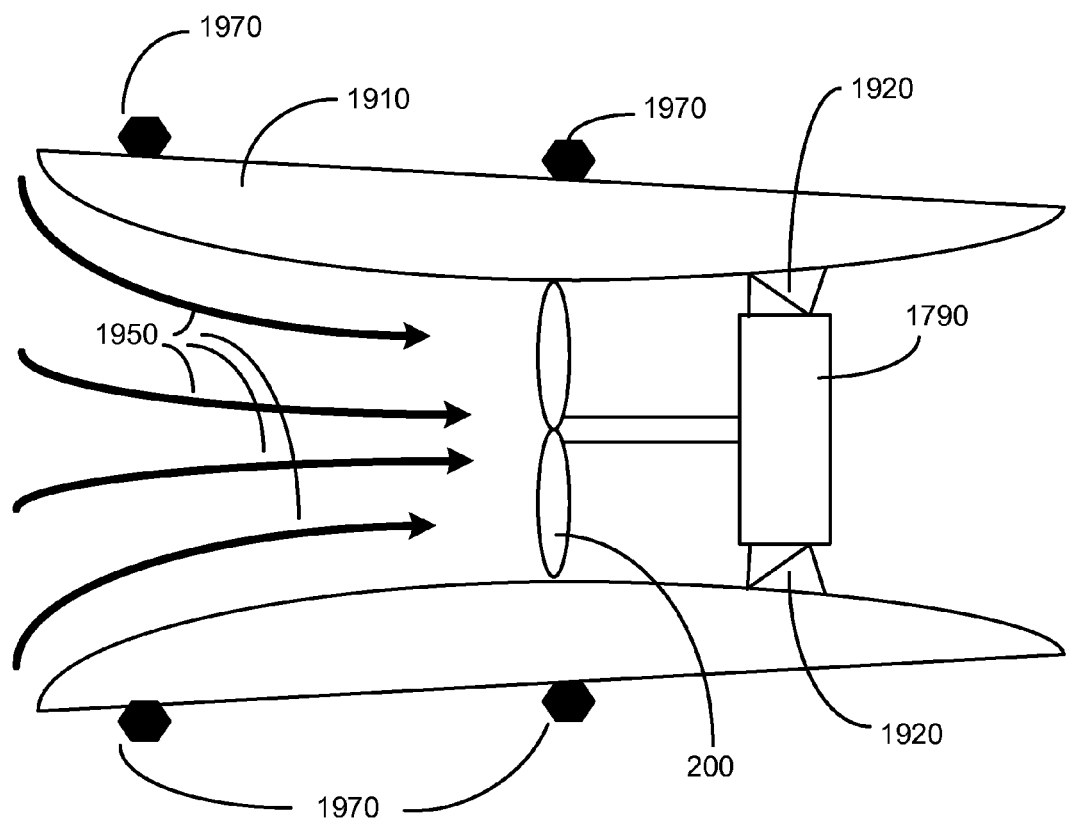
FIG. 19 shows the use of a shroud or cowl to protect and secure the turbine assembly in accordance with an embodiment of this invention.

Although the turbine blades may be exposed, in some cases the need for safety may require that some shrouding be provided. This may be a simple wire guard as commonly found protecting a household fan. However, a solid shroud or cowl which is reasonably close fitting may be advantageous. FIG. 19 shows an exemplar shroud or cowl, 1910, with the turbine, 200, coupled to an energy conversion component such as a electrical generator, 1790. This may improve the efficiency by controlling the flow of the air at the blade tips. The cowl may also be shaped so as to steer and accelerate the airflow, 1950, into the blades of the turbine. A venturi shape, known in the art, may be used to achieve this along with the benefits of keeping the turbulence and the associated noise to a minimum as shown in FIG. 19. This cowl assembly may be integrated with the turbine so as to be the support, 1920, for any turbine bearing assembly, any coupling components that require support and the energy conversion component, 1790. For example, in a simple system, the cowl assembly provides a mount for an electrical generator and the turbine blade assembly is connected to the shaft of the generator. The generator bearings provide the needed support for the turbine blade assembly. It should be noted that in addition to providing rotational security, a bearing may be required to withstand the end thrust load that is applied by the airflow.

A cowl may also have attachment points, 1970, that allow it to be installed in the airflow of the ventilation or exhaust system. Actuators may also be installed at these attachment points so as to provide adjustment capability.

Figure 20A:
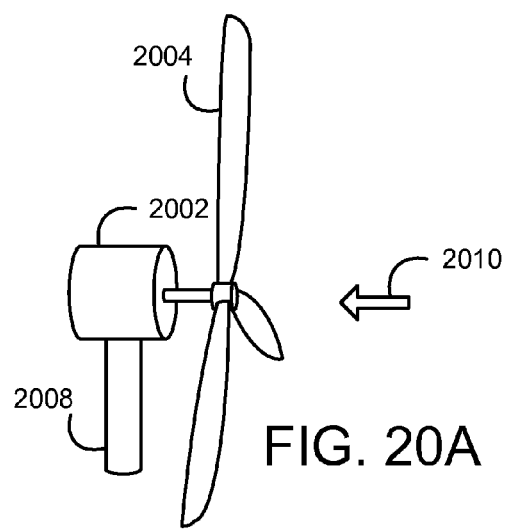
FIGS. 20A, B and C show example illustrations of large scale wind turbines and turbine blades.
Figure 20B:
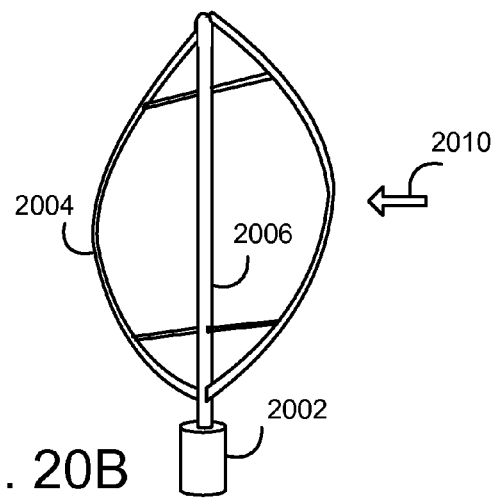
Figure 20C:
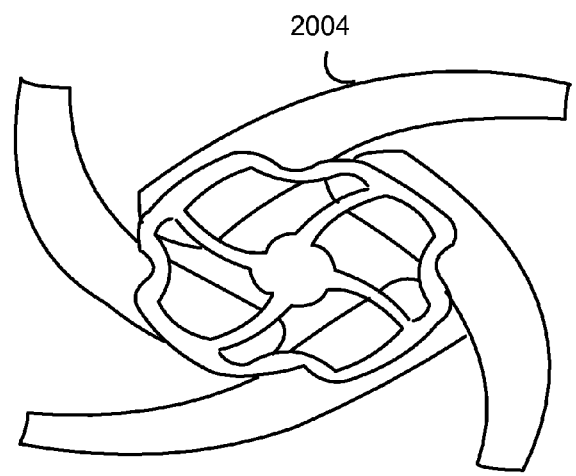

By way of contrasting the current invention with systems and methods used for large scale wind generation, FIGS. 20A and 20B show representative turbine assemblies found in large scale natural wind farms. FIG. 20C shows a variant on the turbine blade assembly, 2004. The wind vector is represented at 2010. The bearing assembly is usually incorporated in the generator housing 2002. In FIG. 20A, the whole assembly of turbine and power generator is normally located on a tower 2008. When a vertical turbine is used, as in FIG. 20B, the power generator and bearing assemblies are often ground mounted and the drive shaft, 2006, is extended so that the upper ends of the turbine blade assembly may be secured.

Figure 21:
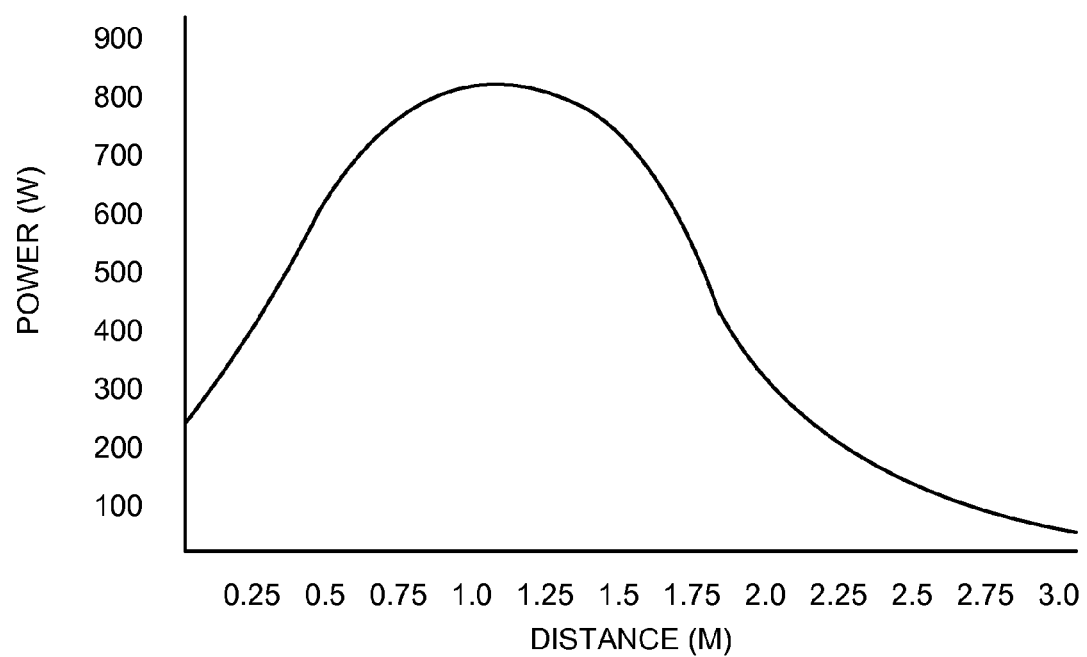
FIG. 21 shows a graph which demonstrates the relationship between the spacing between a turbine and the driving fan of a ventilation system and the power extracted from the turbine, illustrative of measured results in accordance with an embodiment of this invention.

FIG. 21 shows the result of one practical measurement made of power extracted from a ventilation system air flow against the distance that the turbine assembly was placed from the plane of the driving fan.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for harvesting energy from exhaust air flow, the method comprising:
    positioning a wind turbine at substantially optimal separation from an exhaust port for the air flow wherein an axis of rotation of the wind turbine is alterable in two dimensions relative to an axis of the exhaust; and
    capturing the wind energy from the exhaust, wherein the exhaust is channeled through a diffuser, and wherein the diffuser includes a flow straightener.

2. The method for harvesting energy from an exhaust air flow, as recited in claim 1, wherein the separation between the turbine and the exhaust port is approximately one to three times the exhaust port diameter.

3. The method for harvesting energy from an exhaust air flow, as recited in claim 1, wherein the exhaust system includes at least one of a ventilation fan and a combustion source.

4. The method for harvesting energy from an exhaust flow, as recited in claim 1, wherein the separation is determined by the exhaust diameter, the wind turbine diameter and the speed of the exhaust air flow.

5. The method for harvesting energy from an exhaust air flow, as recited in claim 1, wherein the diffuser is substantially cylindrical in shape.

6. The method for harvesting energy from an exhaust air flow, as recited in claim 5, wherein the diffuser is roughly three times as long as its diameter.

7. The method for harvesting energy from an exhaust air flow, as recited in claim 1, wherein the diffuser is substantially conical in shape.

8. The method for harvesting energy from an exhaust air flow, as recited in claim 7, wherein the large diameter edge of the diffuser is rolled.

9. A method for harvesting energy from exhaust air flow, the method comprising:
    positioning a wind turbine at substantially optimal separation from an exhaust port for the air flow wherein an axis of rotation of the wind turbine is alterable in two dimensions relative to an axis of the exhaust; and
    capturing the wind energy from the exhaust, wherein the exhaust is produced by more than one fan, wherein the exhaust is channeled through more than one duct each duct originating from the more than one fan, and wherein the exhaust airflow is passed through a flow straightener installed within each duct.

10. A system for harvesting energy from exhaust air flow, the system comprising:
    a source of exhaust airflow;
    a wind turbine located at substantially optimal separation from an exhaust port for the air flow wherein the axis of rotation of the turbine blades is alterable in two dimensions relative to the axis of the exhaust, and wherein the wind turbine is configured to capture the wind energy from the exhaust; and
    a diffuser configured to channel the exhaust, and wherein the diffuser includes a flow straightener.

11. The energy harvesting system, as recited in claim 10, wherein the separation between the turbine and the exhaust port is approximately one to three times the exhaust port diameter.

12. The energy harvesting system, as recited in claim 10, wherein the exhaust system includes at least one of a ventilation fan and a combustion source.

13. The energy harvesting system, as recited in claim 10, wherein the separation is dependent upon the exhaust diameter, the wind turbine diameter and the speed of the exhaust air flow.

14. The energy harvesting system, as recited in claim 10, wherein the diffuser is substantially cylindrical in shape.

15. The energy harvesting system of claim 10 wherein the optimal separation between the exhaust and the turbine is substantially in the range of 0.5 to 1.5 meters.

16. A system for energy harvesting of fan driven exhaust air comprising:
- a wind turbine having turbine blades, wherein the wind turbine is configured to harvest exhaust air from an exhaust fan, wherein an axis of rotation of the turbine blades is alterable in two dimensions relative to the axis of the exhaust, and wherein the wind turbine is configured to capture the wind energy from the exhaust;
- a diffuser configured to channel the exhaust, and wherein the diffuser includes a flow straightener;
- a turbine controller coupled to the wind turbine;
- one or more turbine sensors for measuring turbine parameters including at least one of position, speed of rotation and torque or angle of attack of the turbine blades;
- an energy conversion component coupled to the wind turbine;
- one or more energy conversion sensors for measuring conversion parameters including at least one of voltage, current, speed, pressure, volume and flow rate;
- a control system responsive to said one or more turbine sensors and said one or more energy conversion sensors providing control signals to the turbine controller;
- wherein an angle of axis of rotation of the turbine blades is alterable by the turbine controller in response to the control signals; and
- wherein a diameter of the wind turbine is less than or equal to a radius of the exhaust fan driving the exhaust air, and wherein the wind turbine is positioned along a diameter of the exhaust fan to be substantially within the radius of the exhaust fan driving the exhaust air.

* * * * *